(12) United States Patent
Marhefka

(10) Patent No.: US 9,134,561 B2
(45) Date of Patent: Sep. 15, 2015

(54) WRITING TABLET INFORMATION RECORDING DEVICE

(71) Applicant: Kent Displays Incorporated, Kent, OH (US)

(72) Inventor: Duane W. Marhefka, Winona, OH (US)

(73) Assignee: KENT DISPLAYS INCORPORATED, Kent, OH (US)

( * ) Notice: Subject to any disclaimer, the term of this patent is extended or adjusted under 35 U.S.C. 154(b) by 34 days.

(21) Appl. No.: 14/057,261

(22) Filed: Oct. 18, 2013

(65) Prior Publication Data

US 2014/0043547 A1 Feb. 13, 2014

Related U.S. Application Data

(63) Continuation-in-part of application No. 13/458,223, filed on Apr. 27, 2012, and a continuation-in-part of application No. 13/666,583, filed on Nov. 1, 2012.

(60) Provisional application No. 61/554,189, filed on Nov. 1, 2011.

(51) Int. Cl.
| | |
|---|---|
| *G02F 1/1333* | (2006.01) |
| *G06F 3/046* | (2006.01) |
| *G06F 3/041* | (2006.01) |
| *G06F 3/038* | (2013.01) |
| *G06F 3/045* | (2006.01) |

(52) U.S. Cl.
CPC ............ *G02F 1/13338* (2013.01); *G06F 3/038* (2013.01); *G06F 3/045* (2013.01); *G06F 3/046* (2013.01); *G06F 3/0412* (2013.01); *G06F 3/0416* (2013.01)

(58) Field of Classification Search
CPC . G06F 3/0488–3/04886; G06F 3/041–3/0414; G09G 3/36; G09G 2300/0486; G09G 2300/0495
USPC ..................... 345/156–184; 178/18.01–20.04
See application file for complete search history.

(56) References Cited

U.S. PATENT DOCUMENTS

| | | | |
|---|---|---|---|
| 4,172,333 | A | 10/1979 | Towsend |
| 4,525,032 | A | 6/1985 | Hilsum |
| 4,688,900 | A | 8/1987 | Doane et al. |

(Continued)

FOREIGN PATENT DOCUMENTS

| | | |
|---|---|---|
| JP | 05053537 | 3/1993 |
| JP | 8035759 | 2/1996 |

(Continued)

OTHER PUBLICATIONS

Yi-Min Chee et al., Ink Markup Lanaguge (InkML) W3C Recommendation Sep. 20, 2011, pp. 1-61; http://www.w3.org/TR/InkML.*

(Continued)

*Primary Examiner* — Patrick F Marinelli
(74) *Attorney, Agent, or Firm* — Pearne & Gordon LLP

(57) ABSTRACT

A drawing tablet device, utilizing a data capture device in connection with a pressure sensitive display, provides electronic information corresponding to images drawn on the pressure sensitive display to an external device. The drawing tablet includes a communication interface to couple the drawing tablet to the external device to transmit electronic information corresponding to images in real-time or as stored files.

19 Claims, 20 Drawing Sheets

(56) References Cited

U.S. PATENT DOCUMENTS

| | | | |
|---|---|---|---|
| 4,700,022 A | 10/1987 | Salvador et al. | |
| 4,730,186 A | 3/1988 | Koga et al. | |
| 4,786,765 A | 11/1988 | Yamanami et al. | |
| 5,031,119 A | 7/1991 | Dulaney et al. | |
| 5,119,079 A | 6/1992 | Hube et al. | |
| 5,135,125 A | 8/1992 | Andel et al. | |
| 5,136,125 A | 8/1992 | Russell | |
| 5,398,276 A | 3/1995 | Lemke et al. | |
| 5,453,863 A | 9/1995 | West et al. | |
| 5,545,857 A | 8/1996 | Lee et al. | |
| 5,579,487 A | 11/1996 | Meyerson et al. | |
| 5,584,054 A | 12/1996 | Tyneski et al. | |
| 5,596,350 A | 1/1997 | Capps et al. | |
| 5,597,470 A | 1/1997 | Karavakis et al. | |
| 5,597,562 A | 1/1997 | Nomura et al. | |
| 5,644,330 A | 7/1997 | Catchpole et al. | |
| 5,691,795 A | 11/1997 | Doane et al. | |
| 5,715,524 A | 2/1998 | Jambhekar et al. | |
| 5,742,894 A | 4/1998 | Jambhekar et al. | |
| 5,748,185 A | 5/1998 | Stephan et al. | |
| 5,761,485 A | 6/1998 | Munyan | |
| 5,768,492 A | 6/1998 | Schumer | |
| 5,778,404 A | 7/1998 | Capps et al. | |
| 5,847,798 A | 12/1998 | Yang et al. | |
| 5,867,688 A | 2/1999 | Simmon et al. | |
| 5,889,566 A | 3/1999 | Wu et al. | |
| 5,930,026 A | 7/1999 | Jacobson et al. | |
| 5,949,501 A * | 9/1999 | Izuno et al. | 349/23 |
| 6,104,448 A | 8/2000 | Doane et al. | |
| 6,215,475 B1 | 4/2001 | Meyerson et al. | |
| 6,266,045 B1 | 7/2001 | Meyerson et al. | |
| 6,268,839 B1 | 7/2001 | Yang et al. | |
| 6,353,433 B1 | 3/2002 | Schumer | |
| 6,377,321 B1 | 4/2002 | Khan et al. | |
| 6,473,072 B1 | 10/2002 | Comiskey et al. | |
| 6,639,578 B1 | 10/2003 | Comiskey et al. | |
| 6,654,080 B1 | 11/2003 | Khan et al. | |
| 6,663,008 B1 | 12/2003 | Pettersson et al. | |
| 6,697,039 B1 | 2/2004 | Yamakawa et al. | |
| 6,730,862 B1 | 5/2004 | Gasparik | |
| 6,753,933 B2 | 6/2004 | Cirkel et al. | |
| 6,756,970 B2 | 6/2004 | Keely, Jr. et al. | |
| 6,759,399 B1 | 7/2004 | Petit et al. | |
| 6,811,815 B2 | 11/2004 | He et al. | |
| 6,819,310 B2 | 11/2004 | Huang et al. | |
| 6,825,829 B1 | 11/2004 | Albert et al. | |
| 6,842,210 B2 | 1/2005 | Hashimoto et al. | |
| 6,999,061 B2 | 2/2006 | Hara et al. | |
| 7,061,559 B2 | 6/2006 | Khan et al. | |
| 7,132,064 B2 | 11/2006 | Li et al. | |
| 7,136,048 B2 | 11/2006 | Yrjanainen et al. | |
| 7,170,481 B2 | 1/2007 | Doane et al. | |
| 7,242,394 B2 | 7/2007 | Lahade et al. | |
| 7,245,483 B2 | 7/2007 | Feague et al. | |
| 7,351,506 B2 | 4/2008 | Schneider et al. | |
| 7,385,656 B2 | 6/2008 | Nose et al. | |
| 7,746,430 B2 | 6/2010 | Kurosaki et al. | |
| 8,139,039 B2 | 3/2012 | Schneider et al. | |
| 8,228,301 B2 | 7/2012 | Schneider | |
| 8,310,630 B2 | 11/2012 | Marhefka et al. | |
| 8,880,597 B1 * | 11/2014 | Pachikov et al. | 709/204 |
| 2003/0058227 A1 | 3/2003 | Hara et al. | |
| 2003/0071754 A1 | 4/2003 | McEwan | |
| 2003/0137496 A1 | 7/2003 | Stevens et al. | |
| 2003/0156099 A1 | 8/2003 | Yrjanainen et al. | |
| 2003/0156243 A1 | 8/2003 | Yoshihara et al. | |
| 2004/0001226 A1 * | 1/2004 | Ohtuka | 358/1.15 |
| 2004/0017375 A1 * | 1/2004 | Lui et al. | 345/581 |
| 2004/0140964 A1 | 7/2004 | Wang et al. | |
| 2004/0145691 A1 | 7/2004 | Kubota et al. | |
| 2004/0159702 A1 | 8/2004 | Rosenfeld | |
| 2004/0199876 A1 * | 10/2004 | Ethier et al. | 715/523 |
| 2004/0207606 A1 | 10/2004 | Atwood et al. | |
| 2004/0263486 A1 | 12/2004 | Seni | |
| 2005/0079386 A1 | 4/2005 | Brown et al. | |
| 2005/0104806 A1 | 5/2005 | Stephenson | |
| 2005/0277448 A1 | 12/2005 | Castaneda et al. | |
| 2005/0289452 A1 * | 12/2005 | Kashi et al. | 715/512 |
| 2006/0046704 A1 * | 3/2006 | Hori et al. | 455/418 |
| 2006/0114339 A1 * | 6/2006 | Ohmura et al. | 348/231.99 |
| 2006/0151603 A1 | 7/2006 | Rosenfeld | |
| 2006/0204675 A1 | 9/2006 | Gao et al. | |
| 2006/0262235 A1 | 11/2006 | Vogels et al. | |
| 2006/0267955 A1 | 11/2006 | Hino | |
| 2007/0026163 A1 | 2/2007 | Schneider et al. | |
| 2007/0059901 A1 | 3/2007 | Majumdar et al. | |
| 2007/0063939 A1 | 3/2007 | Bellamy | |
| 2007/0139399 A1 * | 6/2007 | Cook | 345/179 |
| 2007/0237906 A1 | 10/2007 | Li et al. | |
| 2007/0238080 A1 | 10/2007 | Lynch | |
| 2007/0277659 A1 | 12/2007 | Schneider et al. | |
| 2007/0285385 A1 | 12/2007 | Albert et al. | |
| 2008/0309598 A1 | 12/2008 | Doane et al. | |
| 2009/0033811 A1 | 2/2009 | Schneider | |
| 2009/0096942 A1 | 4/2009 | Schneider et al. | |
| 2009/0203349 A1 * | 8/2009 | Hollstien | 455/404.1 |
| 2010/0153167 A1 * | 6/2010 | Kretzschmar et al. | 705/9 |
| 2010/0265214 A1 * | 10/2010 | Green et al. | 345/174 |
| 2011/0060910 A1 | 3/2011 | Gormish et al. | |
| 2011/0248941 A1 | 10/2011 | Abdo et al. | |
| 2012/0268420 A1 | 10/2012 | Marhefka et al. | |
| 2013/0107144 A1 | 5/2013 | Marhefka et al. | |

FOREIGN PATENT DOCUMENTS

| | | |
|---|---|---|
| JP | 2001125108 | 5/2001 |
| JP | 2001334693 | 12/2001 |
| JP | 2002163070 | 6/2002 |
| JP | 2004331697 | 11/2004 |
| WO | 2010138568 | 2/2010 |

OTHER PUBLICATIONS

ADP-601 electronic pen; black paper sheet with infrared dot array and PenHub Software all from Pengenerations, Jun. 23, 2013, http://pengenerations.com/.

U.S. Appl. No. 13/666,583, filed Nov. 1, 2012.

U.S. Appl. No. 61/554,189, filed Nov. 1, 2011.

U.S. Appl. No. 13/458,223, filed Apr. 27, 2013.

U.S. Appl. No. 13/477,638, filed May 22, 2012.

U.S. Appl. No. 13/897,004, filed May 17, 2013.

C. Braganza, et al., Durability and Reliability of eWriters, SID International Symposium Digest of Technical Papers 44 (2013) pp. 1254-1256.

U.S. Appl. No. 13/754,481, filed Jan. 30, 2013.

"Cholesteric Liquid Crystals for Flexible Displays" by Ed. G. Crawford.

Dry Erase Presentation Boards; http://speakeasydryerase.com/files/specifications/SelfAdhesiveSpec.pdf.

Etch a Sketch Animator 2000; http://en.wikipedia.org/wiki/Etch_A_Sketch.

International Search Report for Appl. No. PCT/US2010/036175.

How Magna Doodle Works; http://entertainment.howstuffworks.com/magna-doodle.htm.

Interactive Whiteboard; http://www.alibaba.com/product-gs/212710367/Interactive_Whiteboard.html.

U.S. Appl. No. 14/069,901, filed Nov. 1, 2013.

J. William Doane and Asad Khan, Flexible Flat Panel Displays, Editor Gregory P. Crawford, Chapter 17: Cholesteric Liquid Crystals for Flexible Displays, 2005 John Wiley & Sons, pp. 331-354.

N. Brenner and S. Sullivan, "4-Wire and 8-Wire Resistive Touch-Screen Controller Using the MSP430- Application Report SLAA384", Feb. 2008, pp. 1-10, Texas Instruments, Dallas, TX.

Notice of Allowance issued on Feb. 16, 2012 from U.S. Appl. No. 12/217,158, filed Jul. 1, 2008.

Office Action dated Jun. 24, 2011 from U.S. Appl. No. 11/762,174, filed Jun. 13, 2007.

Final Office Action dated Jan. 19, 2012 from U.S. Appl. No. 11/762,174 filed Jun. 13, 2007.

(56) References Cited

OTHER PUBLICATIONS

Smartboard Polycom IVC; http://dl.austincc.edu/ivc/equipment/smartboardh323.htm.
Ink Markup Language, W3C Recommendation Sep. 20, 2011, http://www.w3.org/TR/2011/REC-InkML-20110920/.
U.S. Appl. No. 61/181,716, filed May 28, 2009.
InkChat Project, ORCCA Lab, Department of Computer Science, The University of Western Ontario, http://www.csd.uwo.ca/~rhu8/Research/Projects/InkChat/inkChat.html, Jul. 9, 2013.
International Search Report and Written Opinion dated Feb. 18, 2015 for PCT/US14/49729.

* cited by examiner

WRITING TABLET INFORMATION RECORDING DEVICE

CROSS-REFERENCES TO RELATED APPLICATIONS

This application is a continuation-in-part of U.S. patent application Ser. No. 13/666,583, filed on Nov. 1, 2012, which claims the benefit of U.S. provisional application Ser. No. 61/554,189, filed on Nov. 1, 2011. This application is also a continuation-in-part of U.S. patent application Ser. No. 13/458,223, filed on Apr. 27, 2012. All of these applications are incorporated herein by reference.

BACKGROUND OF THE INVENTION

This application relates generally to a writing/drawing tablet. More specifically, this application relates to utilizing a pressure sensitive display in combination with a touch screen that can capture image data from the image being drawn on the pressure sensitive display and share the image via wireless connectivity.

In general, Bistable Liquid Crystal Displays (BLCD), and in particular, Cholesteric Liquid Crystal Displays (ChLCDs), have proven to have great potential to create low cost pressure sensitive displays that are efficient power consumers and that can be utilized in a number of unique devices. These displays use a pressure sensitive feature of the ChLCDs that allows generating an image using pressure but consuming little or no power to do so, and requiring no power to maintain the image on the display for extended periods.

Recently, the Boogie Board® pressure sensitive cholesteric liquid crystal writing tablet, of Improv Electronics® has appeared on the market in which a pointed stylus or a finger of a user can be used to write or trace an image on the surface of the tablet. (Improv Electronics® is a unit of Kent Displays, Inc.) Such a stylus does not transfer any ink or other material to any surface. This tablet offers a considerable improvement over previous tablet technologies in that the image can be simply and instantly erased with the push of a button that applies a voltage pulse to electrodes in the tablet. In a cholesteric liquid crystal tablet, the liquid crystal is sandwiched between two substrates that are spaced to a particular gap. The upper substrate is flexible and the bottom substrate is painted with a light absorbing (black or colored) background. The cell gap is usually set by plastic or glass spacers that are either cylindrical or spherical in shape. When one presses on the top substrate with a point stylus or finger or nail tip or other object, the liquid crystal is locally displaced. Flow induced in the liquid crystal changes its optical texture from a transparent to a brilliant reflective color at the location of the pressure. The reflective lighter color contrasts well to the dark background of the lower substrate. An image traced by the stylus or finger will remain on the tablet indefinitely until erased, typically consuming no power. Erasure is accomplished by applying a voltage pulse to transparent conducting electrodes on the inner surface of the substrates that drive the cholesteric liquid crystal from its color reflective state back to its transparent state.

The above described principle is disclosed in more detail in U.S. Pat. No. 6,104,448, incorporated herein by reference. Polymer dispersions can be used to control the pressure sensitivity and resolution of the image as described in U.S. patent application Ser. No. 12/152,729, filed on May 16, 2008, and incorporated herein by reference. Other modes of operation including multiple color images and select erase are described in the patent application publication given above as well as U.S. Pat. No. 8,139,039 filed on Jul. 29, 2008, and incorporated herein by reference.

It would therefore be desirable to have a writing tablet device where an image being drawn is directly observed on the drawing pad but simultaneously (or subsequently) captured electronically and digitized so as to be observed on a computer screen or any other external device connected to the writing tablet device as well as stored for later recall and use. It would be further useful that the device be able to operate as an input device to a connected external device and that the connected external device have specialized software to allow users to enhance the image and share the image with others over the internet. Examples of external devices include smartphones, tablets, personal computers (laptops/desktops) netbooks, possible eReaders with connectivity and other devices with Bluetooth and appropriate software. The writing tablet device may contain software written for Apple iOS devices and additional software written for Android and other devices. Other features such as low-cost and low-power requirements would be of further advantage.

SUMMARY OF THE INVENTION

Provided are a plurality of embodiments of the invention, including, but not limited to, a drawing tablet device with data capture. The tablet device includes a pressure sensitive drawing surface including a pressure sensitive liquid crystal material configured to display an image drawn upon the drawing surface by application of pressure on the drawing surface using a stylus, and to continue displaying the image without the pressure sensitive drawing surface consuming electrical energy. The drawing tablet device includes an erase switch for selecting an erase function provided by the drawing tablet device to erase the image from the pressure sensitive drawing surface. The drawing tablet device includes an electronic data capture device including a data capture layer configured to electronically capture movements of the stylus on the pressure sensitive drawing surface as electronic information representing the image. A processor configured to create a digital ink file recording individual drawing strokes on the pressure sensitive drawing surface, based on the electronic information representing the movements of the stylus, for further use of the image by an external processing device. An interface is configured to connect to the external processing device, wherein the drawing tablet device is configured to transmit to the external processing device one or both of the digital ink file and the electronic information representing the movements of the stylus, via the interface.

In accordance with another aspect of the present invention, provided is a system comprising a drawing tablet device and an external processing device configured to receive image data from the drawing tablet device. The drawing tablet device includes a bistable cholesteric liquid crystal display configured to display an image drawn upon the bistable cholesteric liquid crystal display by application of pressure on the bistable cholesteric liquid crystal display, and to continue displaying the image without the bistable cholesteric liquid crystal display consuming electrical energy to display the image. The tablet device includes an erase switch for selecting an erase function provided by the tablet device to erase the image from the bistable cholesteric liquid crystal display. The tablet device includes an electronic data capture device including a data capture layer configured to electronically capture movements of a stylus upon the bistable cholesteric liquid crystal display as electronic information representing the movements of the stylus. An interlace is configured to connect to the external processing device. The drawing tablet device is configured to transmit the image data to the external processing device, based on the electronic information representing the movements of the stylus. The image data comprises at least position information concerning a positions of the stylus as the image is drawn and information related to pressure applied to the bistable cholesteric liquid crystal display as the image is drawn. The external processing device includes a further interface configured to connect to the drawing tablet device and receive the image data, and a further display that replicates the image drawn upon the bistable cholesteric liquid crystal display including replicating line widths in the image drawn upon the bistable cholesteric liquid crystal display based on the information related to pressure applied to the bistable cholesteric liquid crystal display as the image is drawn.

According to yet another aspect, a drawing tablet device with data capture is provided. The drawing tablet device can include a bistable cholesteric liquid crystal display having a drawing surface configured to display an image drawn upon the drawing surface by application of pressure on the drawing surface. The bistable cholesteric liquid crystal display maintains display of the image without consuming electrical energy. The drawing tablet device can further include a data capture device configured to generate electronic information representing movement of a stylus on the drawing surface. The data capture device operates separately and independently from the bistable cholesteric liquid crystal display. In addition, the drawing tablet device can include a communication interface for communication with an external device. The drawing tablet device, while connected to the external device via the communication interface, is configured to transmit the electronic information, in real-time or near real-time, as the electronic information is generated by the data capture device. The electronic information includes at least location information indicating positions of contact of the stylus on the drawing surface and magnitude information indicating an intensity of the contact of the stylus on the drawing surface to enable duplication, by the external device, of the image drawn upon the drawing surface, the duplication included replication of line weights.

In accordance with another aspect, a system is provided that comprises a drawing tablet device and a capture application configured to execute on an external device having a processor coupled to a non-transitory, computer-readable medium storing the capture application and a display. The capture application is configured to acquire image data from the drawing tablet device. The drawing tablet device comprises a bistable cholesteric liquid crystal display having a drawing surface configured to display an image drawn upon the drawing surface by application of pressure on the drawing surface, the bistable cholesteric liquid crystal display maintains display of the image on the drawing surface without consuming electrical energy; a data capture device configured to generate electronic information corresponding to movement of a stylus on the drawing surface, the data capture device operating separately and independently from the bistable cholesteric liquid crystal display; and a communication interface to transmit image data based on the electronic information to the external device, in real-time or near real-time, upon generation by the data capture device. The capture application is configured to render an image to the display of the external device, the image being a replica of the image displayed on the drawing surface by the bistable cholesteric liquid crystal display and based on the image data received from the drawing tablet device.

Also provided are additional embodiments of the invention, some, but not all of which, are described herein below in more detail.

BRIEF DESCRIPTION OF THE DRAWINGS

The features and advantages of the examples of the present invention described herein will become apparent to those skilled in the art to which the present invention relates upon reading the following description, with reference to the accompanying drawings, in which.

DETAILED DESCRIPTION OF THE EXAMPLE EMBODIMENTS

Figure 1:
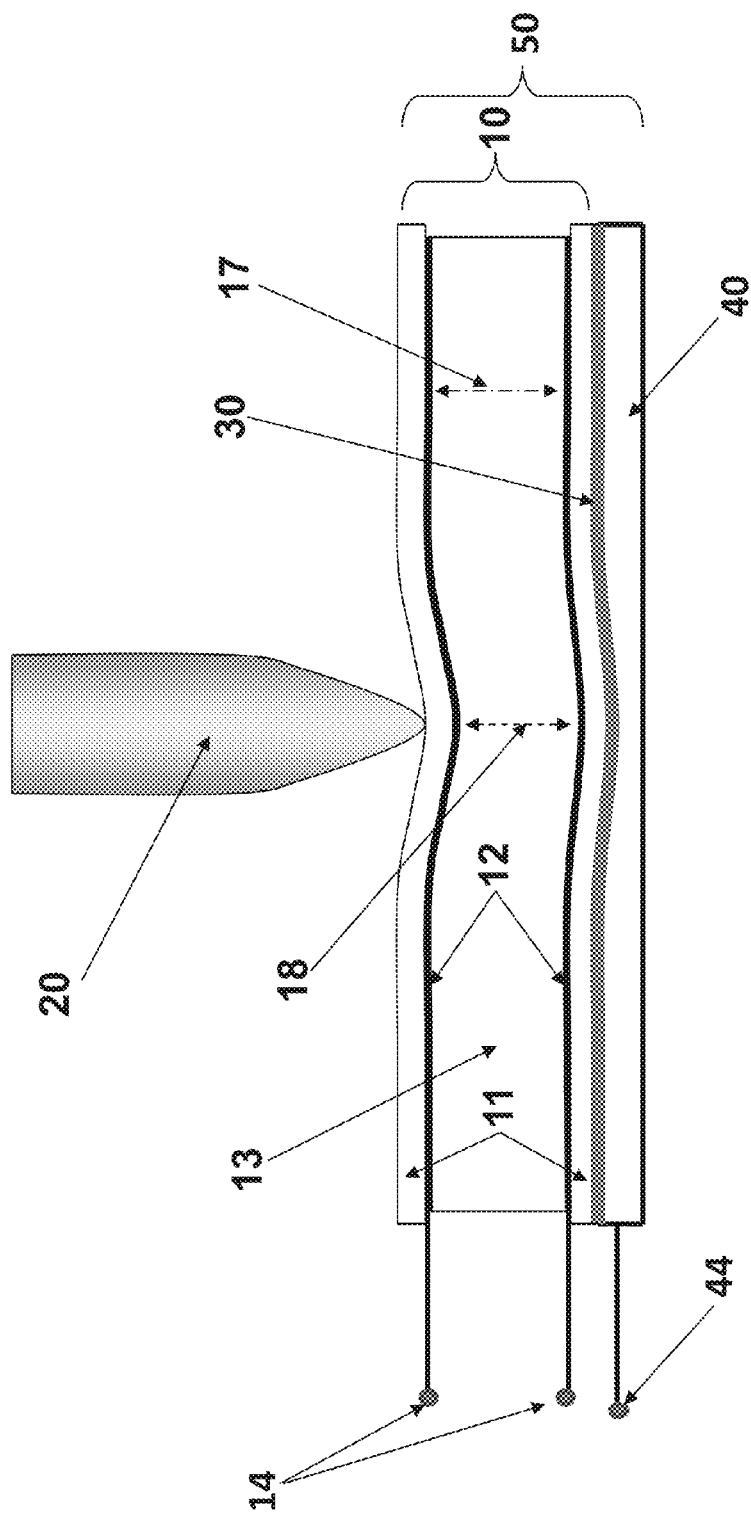
FIG. 1 shows a schematic drawing of an embodiment of a writing/drawing tablet using a resistive touch screen.

Provided are embodiments of an electronic writing/drawing tablet that has one or more of the desired features discussed above. The terms "drawing" and "writing" are used as synonyms throughout this disclosure. Both terms are used interchangeably to mean both the drawing of images, lines, etc. and the writing of words, letters, etc., and where only one term is used, it is equivalent to using the other term as well.

An electronic writing tablet as disclosed herein is a design that can be based on Kent Displays' Reflex® technology as disclosed in U.S. Pat. No. 6,104,448 and in U.S. patent application Ser. No. 12/152,729 now issued as U.S. Pat. No. 8,228,301; and Ser. No. 12/220,805, now issued as U.S. Pat. No. 8,139,039, all incorporated herein by reference, and which can be utilized for various embodiments of a writing/drawing tablet drawing surface modified to have a data capture feature. The Reflex® technology disclosed in these references makes use of the special pressure sensitivity of certain materials, in particular in a cholesteric polymer composite system, by converting the writing pressure on the display into visible track on the display. Furthermore, POT application no. PCT/US10/36175 filed on May 26, 2010, incorporated herein by reference, discloses a related device with data capture capability. Various example embodiments of the tablet disclose several ways to integrate memory function and/or data capture functions into such writing/drawing tablets.

One approach is to use a state-of-the-art data capture device, such as a touch screen, to simultaneously capture the information being drawn on the tablet drawing surface. For example, a simple, low cost touch screen provided on the back of the writing/drawing surface can be utilized to capture the stylus movement by utilizing the capture features of the touch screen, as illustrated in FIG. 1, described in more detail below.

There are many touch input methods that can be used with the writing/drawing tablet as proposed herein to provide the data capture feature, such as are provided by capacitive, inductive, resistive, optical, acoustic, and other touch-input technologies. The touch screen can, for many applications, utilize relatively low resolution technology such as a low-cost resistive touch screen, and such a screen could even avoid the use of the traditional transparent conductor indium tin oxide (ITO), because it can be provided behind (underneath) the writing surface because the writing surface can be made flexible. Such a touchscreen may use a passive stylus. Likewise, a touch screen behind (underneath) the writing surface is also possible with such other touch screen technologies such as the inductive (Electromagnetic Resonance (EMR)) method of at least one preferred embodiment discussed herein, since the writing surface is transparent to the inductive stylus, which can be used to apply the desired pressure to the writing surface. The resistive and inductive methods are examples of touch screen technologies that will not interfere with the intended operation of the tablet. These technologies also provide the benefit that their stylus does not require a tether to the writing/drawing tablet.

The writing/drawing tablet with the integrated touch screen would not likely require extensive processing capability integrated into the device itself for most such applications. The combination writing/drawing tablet drawing surface and touch screen would preferably be adapted to be connected to an external device, such as a computer or cell phone, for example, which could then provide any necessary processing capability, such as for image processing, etc. Alternatively, some minimal processing capability can also be provided in the tablet itself in order to perform some rudimentary processing functions, such as A/D conversion, minor image processing, memory management functions, communication functions, and/or display processing functions, any or all of which can be provided where desired, for example. Features controlling the transmission of stored images to an external device, or for display on an integrated review display as an additional display, can also be supported. Of course, any amount of processing can be provided by adding a more powerful processor(s) and more complex software, if desired.

The connection between the tablet and the external device can be wired or wireless, as desirable for the intended application. Thus, as examples, a wired connection, a direct wired connection, or a USB or other serial port connection could be utilized, or even an Ethernet connection for some embodiments. For wireless connectivity, a WiFi, Bluetooth, NFC, infrared, 3G, or other connection mechanism could be utilized. In some embodiments, both wired and wireless connections might be provided, although the desire to keep the cost of the tablet low, keep it small, thin and light, and the desire to reduce power consumption as far as possible might limit the number of features that one provides in some embodiments of the tablet. A minimal tablet with just those features needed to operate the device and internally store and/or transfer images to external devices thus may be a preferred example embodiment.

An interface can be provided on the tablet to connect the tablet to an external device. Such an interface can use custom protocols, or make use of any of several commercially available standards. For example, implementing the USB Mass Storage class will permit images saved on the tablet to appear in the file system of a host computer, while the USB Human Interface Device class may be used to present the tablet as a digitizer input device or a mouse to an external host computer or other device. Additionally, a Wintab driver could be written for the tablet, such that any application written to the Wintab specification could use the tablet as an input device. Similar standards exist for Bluetooth as well, such as the File Transfer Profile and the Human Interface Device Profile. Thus, the processor of the tablet might be adapted to manage a file system in the tablet memory to support such functions.

For many applications, it is desirable to reduce the cost of the recordable writing/drawing tablet significantly by utilizing the processing capability of the external device, whenever possible. Of course, when desirable, the processing capability could be integrated into the tablet itself for applications where an external device is either not expected to be available, or does not have sufficient processing capability for the intended application(s), or to provide a more self-contained tablet more like a computer.

Thus, the tablet could have a processor (such as a microcontroller, CPU, or other type of processor) incorporated therein to provide sufficient processing in the device. Dedicated processors for implementing the desired interface (e.g., USB, Ethernet, WiFi, Bluetooth, near-field, etc.) could be utilized, and may be available off-the-shelf with either commercially available, or customized, software/firmware. The atom processor line from Intel is one example of a low-power processor that might be used.

Alternatively, or in addition, a dedicated processor, controller, A/D device, or other electronics might be provided to digitize, filter, or otherwise modify the image drawn on the tablet, and such devices are known to be used with some touch screen applications and some are commercially available.

Furthermore, the tablet might incorporate a memory device, such as RAM, flash, EEPROM, a hard drive, or other data storage mechanism, to store images drawn on the display within the device for later download to a computer or other device. Such a memory could enable the device to store hundreds, or even thousands or more images in the memory. Such memory devices might be removable, such as a USB drive or flash memory card commonly available for digital photography and music storage, for example. An example preferred embodiment of the tablet includes a slot for insertion of commercially available removable flash memory. Thus, in some embodiments, removable memory might avoid the need for tablet connectivity to external devices, as the memory can be removed to be used in other devices, instead.

As discussed above, there are many data capture options, including many touch input methods, that can be used with writing tablets to obtain data capture functionality, such as pressure sensitive touch screens, inductive touch screens (such as Electromagnetic Resonance (EMR) touch screens), optical touch screens, acoustic touch screens, capacitive touch screens, and others.

One preferred example embodiment utilizes an inductive (EMR) touch screen with a specialized stylus, such as an active stylus that electrically interacts with the touch screen. An example of such a touch screen device and stylus that might be utilized for such an embodiment is given in U.S. Pat. No. 5,136,125, incorporated herein by reference. Two different EMR technologies are available, one of which uses a specialized stylus that contains a battery whereas the other EMR technology uses a stylus that has no battery. Both technologies are suitable for use with the writing/drawing tablet. In such an embodiment, the touch screen is placed underneath the drawing surface, and thus does not interfere with the drawing and display process and hence does not require expensive transparent components. The inductive touch screen inductively (electromagnetically) detects the presence of the specialized stylus sufficiently near the touch screen in any one of a number of different ways that can be used. One manner of detection is that the specialized stylus is provided with a tuned circuit that oscillates and thereby communicates electromagnetically with a "detector" on the touch screen, which detects this oscillation. The stylus is either powered using an internal battery, or preferably it is powered electromagnetically by receiving power from the touch screen itself, such as electromagnetically (e.g., inductively). Depending on how close the stylus is to the touch screen, or how far the user presses the stylus tip into the screen (such as for a stylus with an adjustable tip), a wider or narrower width line might be detected electronically as the stylus is moved across the drawing surface. For example, a wider line might be determined when an adjustable tip is pressed into the screen, bringing the tuned circuit closer to the touch screen detector, and thus presenting a more powerful (or more coupled) connection.

However, as discussed in more detail below, in the inductive touch embodiment, the electronic version of the image is detected (to be electronically stored and/or transferred) independently of the drawn image, as the former detects electromagnetic coupling between the tuned circuit and the detector, whereas the latter uses pressure from the stylus on the writing surface to display an image. Nevertheless, when properly balanced, the two both capture very similar or identical images, and thus the user is none the wiser.

In at least some embodiments, the stylus of an inductive touchscreen can be detected even when it does not quite touch the drawing surface, in which case stylus movements might be electronically captured but nothing drawn on the pressure display. This can be useful when using the stylus to control a cursor on an attached device for implementing specific functions, and it might be desirable in other situations as well. By pressing the stylus harder (deeper) into the drawing surface, a thicker line can be both drawn on the drawing surface (due to the increased pressure of the stylus), and a thicker line can also be detected by the touch screen due to the tip of the stylus (or the electromagnetic components) being closer to the touch screen, or via the relative position of the stylus tip within the stylus (e.g., which could result in the adjustment of a variable LC circuit in the stylus that can be detected). Thus, line width can be similarly or identically adjusted in both the displayed, and the electronically captured, images.

Note that in the above embodiment using an inductive touch screen and the specialized (e.g., active) stylus, data is only captured by the touch screen when the specialized stylus is used. Thus, if one draws on the drawing surface of the tablet using a finger, or a non-specialized stylus (which may be provided expressly for the purpose of not capturing the image) or pen or pencil, for example, the result is that an image can be drawn on the drawing surface for viewing, but no data is collected by the inductive touch screen, and thus no corresponding electronic image is captured. This could be utilized to allow users to draw on the drawing surface without use of the stylus, but the user cannot capture the drawing electronically in such circumstances. This might be desirable in some situations. However, if it is desired to capture the drawing electronically, the specialized stylus should always be used in such cases. Thus, replacement specialized styluses can be made available, where the original may have been lost or damaged.

Figure 2:
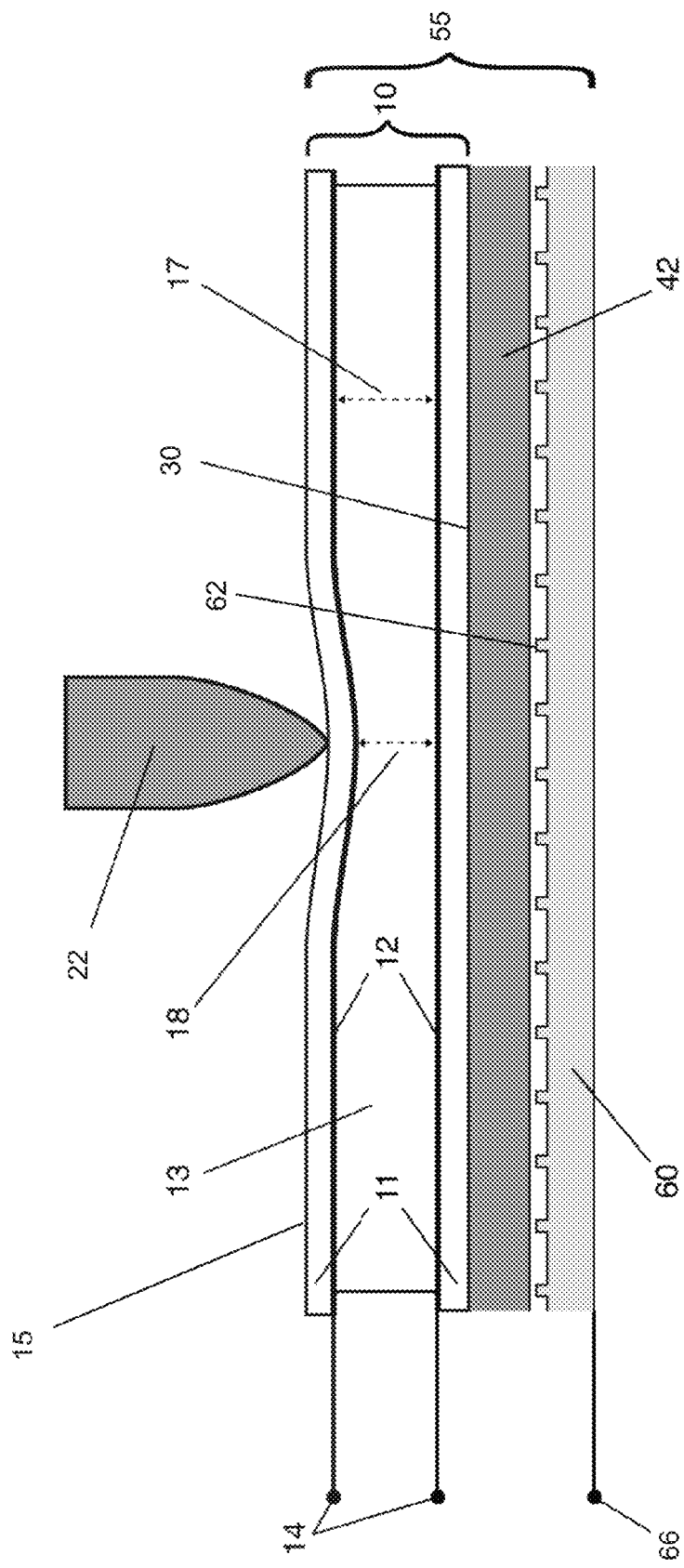
FIG. 2 shows a schematic drawing of an embodiment of a writing/drawing tablet using an inductive touch screen.
Figure 2A:
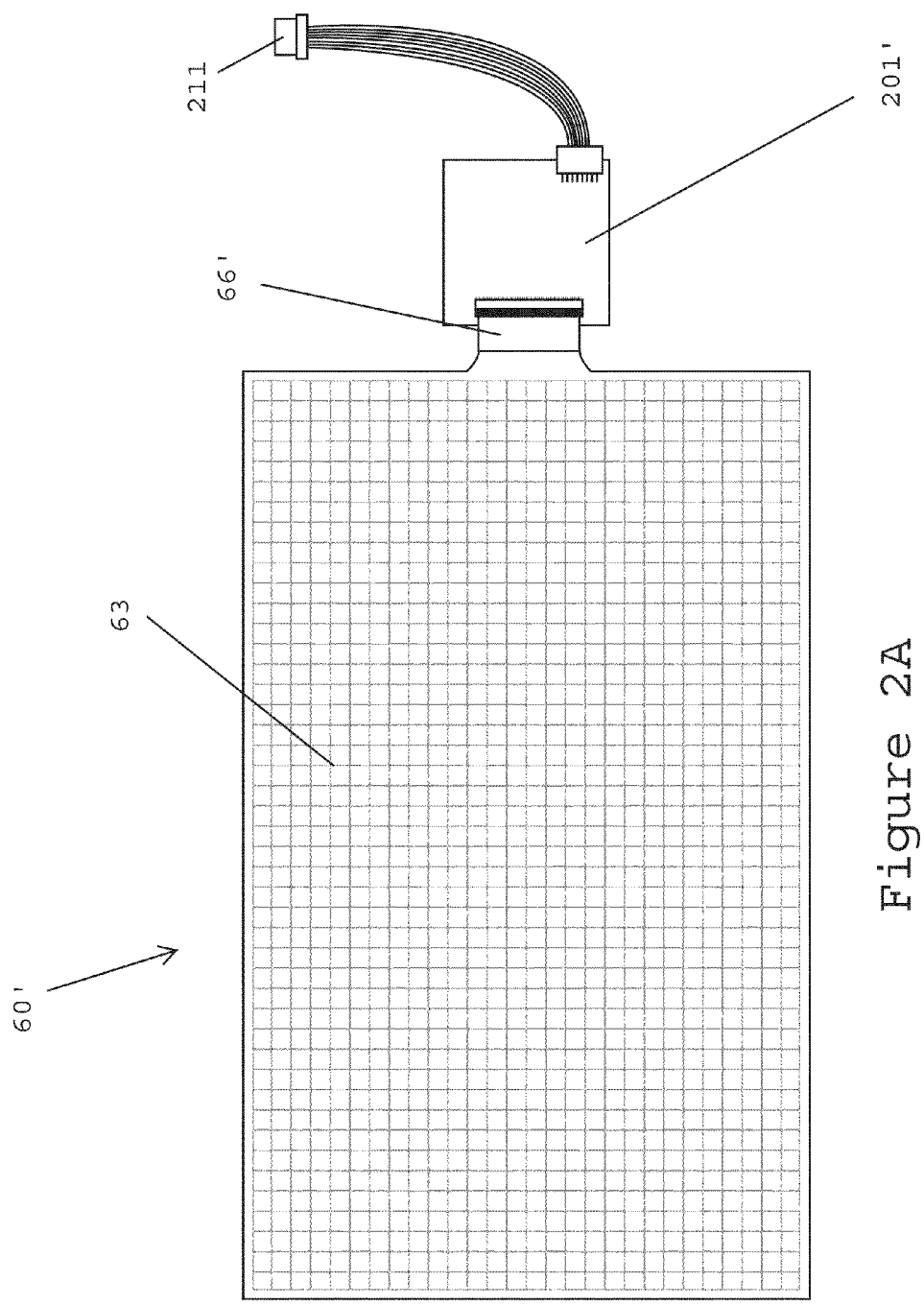
FIG. 2A shows a schematic drawing of an example inductive touch screen that can be used to implement the embodiment of FIG. 2.

FIG. 2 shows a schematic of the layers of the drawing tablet with an integrated inductive touch screen of a data capture device. The inductive touch screen 60 is a data capture layer that is placed underneath the drawing surface 10 to provide an integrated writing and recording surface 55. FIG. 2A shows a specific example of such a touch screen 60' with the grid surface 63 facing up with connector 66' for connecting to data capture controller electronics 201' that are further connected to internal tablet electronics by connector 211.

Again referring to FIG. 2, a plastic separator sheet 42 of flat material is provided between the touch screen 60 and the drawing surface 10 to "planarize" the surface of the touch screen 60, which in many examples is not completely smooth due to the presence of a wire grid 62 crisscrossing the surface of the touch screen 60 for sensing the presence of the inductive stylus (e.g., as detectors, and, in some cases, for providing power electromagnetically to the stylus). This plastic separator sheet 42 is a layer placed between the data capture (touch-screen 60) layer and the drawing layer (drawing surface 10) that is used to prevent images of the wire grid 62 of the touch screen from appearing in the display (drawing layer) during use (i.e., prevent "bleed through" due to the pressure sensitivity of the drawing pad display to pressure), especially in situations where a large portion of the screen might be contacted and gently pushed, such as by a hand or covering, for example.

Alternative approaches to preventing "bleed through" might use a coating over the touch screen surface, rather than the plastic sheet. Coatings, for example, may be used that are blade coated or otherwise coated as a liquid then subsequently cured or hardened to a smooth surface. Sprayable or spreadable materials that can be gelled or hardened, such as paint, adhesives, potting material, etc., may also be used and might further serve an additional function such as gluing the layers together. Alternatively, a sheet with indentations that match and accept the wire grid 62 might also be used.

Typically, it is desirable to have the entire thickness of the device as thin as possible, in particular less than 1 cm thick in a preferred embodiment. Clearly, the thinner the drawing surface 10, the easier for the touch screen to detect the stylus (as the tuned circuit can be closer to the detectors). Also, thinner separator sheet layers are desirable, with thicknesses of 2.35 mm for injection molded ABS to 1.4 mm of acrylic working well, although thicknesses on the order of a few thousandths of an inch may be desirable wherever practical.

The drawing surface 10 of this example embodiment has an external writing surface 15 and includes two flexible substrates 11, each with transparent conductive electrodes, 12 located on the inner surface. A pressure sensitive liquid crystal layer 13 including cholesteric liquid crystal material dispersed in polymer, rests between the electrodes 12. The data capture device includes a specialized stylus 22. Pressure from the stylus, 22, creates a smaller gap distance 18 in the drawing surface 10, compared to the relaxed distance 17, which causes the liquid crystal to flow and changes the cholesteric texture from a substantially transparent, stable focal conic texture to a reflective, stable planar texture which becomes a visible image to the eye when contrasted on a dark, usually black background as provided by a light adsorbing layer, 30 (e.g., a black layer 30). Thus, the image is drawn on the drawing surface 10 and displayed to the user without the consumption of electrical power, as the image is formed by the distortion of the liquid crystal caused by the stylus pressure, and the image is persistent due to the bistable nature of the liquid crystal. Thus, the image remains when the pressure is removed.

In the case of an inductive touch screen of this example embodiment, pressure from the tip of the specialized stylus 22 is utilized by the user to draw on the external writing surface 15 to create an image on the drawing surface (without leaving matter on the external writing surface 15). At the same time, stylus location information is transferred through the drawing surface 10 to the touch screen 60 by electromagnetic interaction of the specialized stylus 22 and the wire grid 62 of the touch screen, by determining the position or location of the stylus (or the tuned circuit located therein, or an antenna located therein) as location data. There is no need to use pressure information of the stylus in the touch screen to determine the location data in an inductive approach. This location data from the touch screen is transferred to touch pad electronics (not shown) via electrodes 66. There can be a plurality of electrodes 66 depending upon the type of inductive touch screen utilized.

As described, for example, in U.S. Pat. Nos. 4,786,765 and 5,135,125 herein incorporated by reference, inductive touch screens utilize a special stylus, such as one that includes the tuned circuit of an inductor and capacitor connected in series. The stylus is typically provided without connection to a power supply or other device, but has a resonant frequency approximately equal to the frequency of a wave derived from a coil arrangement in a tablet. The position of the stylus on the tablet is detected by coupling energy induced in the stylus back to the electrode grid on the tablet. In a commercially available Waltop device, the Sensor Board, Control Board, and UART connection can be used to communicate with the tablet MCU Device.

Another example embodiment utilizes a pressure sensitive touch screen for the data capture feature, whereby the location of the stylus is recorded by its location on a resistive pad provided on the back side of the drawing surface 10 of the writing tablet, as illustrated in FIG. 1. In FIG. 1, a stylus, 20, provides pressure to the electronic writing tablet drawing surface 10 in a manner similar to that discussed above with respect to FIG. 2.

For this alternative embodiment, the pressure sensitive touch screen 40, is placed adjacent to the drawing surface 10 to provide an integrated writing and recording surface 50. The drawing surface 10 is similar to that described above for FIG. 2, using transparent electrodes 12 on flexible substrates 11 with a liquid crystal material 13 provide between. In the case of a pressure sensitive touch screen such as a resistive one, pressure from the stylus 20 is transferred through the drawing pad 10 to the touch screen 40 at 18, indicating its position or location on the touch screen. The relaxed state is shown at 17. The resistive data from the touch screen is transferred to digital recording electronics via electrodes 44. There can be a plurality of electrodes 44 depending upon the type of resistive touch screen utilized. This particular embodiment can be provided at a relatively low cost, is relatively simple, and can be made very thin and light in weight. A commercial touch screen can be used in this embodiment or it can be custom designed to be better integrated with the writing tablet. Alternative embodiments can utilize other types of touch screen technologies.

Of course, in some alternative embodiments, the image could be provided as a negative of the above described process by providing a light reflective light background that becomes transparent in response to the stylus pressure under an applied voltage exposing a dark light absorbing background. Either embodiment can be used to display an image due to the contrast between the background and the portion of the liquid crystal that was deformed by the pressure, thereby producing the desired image.

In still other embodiments, a digital camera or other optical capture device can be utilized to capture the image instead of the touch screen. The camera or image sensor may be one such as in a hand carried portable phone with processing capability to identify and capture only the writing surface of the tablet containing the image then displaying the image on the display screen of the phone as well as storing it in memory for later viewing. The camera image might also be used to sharpen the image or otherwise clean up the image by removing artifacts or reflections, for example.

For any of the above embodiments, the entire image may be erased from the pressure sensitive drawing surface 10 by applying voltage pulses to the electrodes 12, via the interconnects 14, such as disclosed in U.S. Pat. No. 6,104,448 and U.S. Pat. Nos. 8,228,301 and 8,139,039, incorporated by reference. In the example embodiments, these pulses are applied when the erase function is activated, either by pressing an "erase" button, or receiving an erase command from a connected device, or by some other method. In preferable embodiments, electrical power is required by the drawing surface 10 only for erasing the image and putting the liquid crystal back into a neutral state for receiving the next drawing image. There is little or no power consumption during the drawing phase using the above described embodiment. However, electrical power will typically be required for the touch sensor to capture the image data electronically, when this functionality is enabled.

Alternative embodiments may utilizes some electrical power for the drawing process, such as for various contrast improving functions, providing a negative mode (e.g., mode A discussed below), or partial (selective) erasing, as discussed below, but generally it does not require any power to maintain a stable image on the display itself due to the bistable nature of the liquid crystal utilized for the device.

In additional example embodiments with data capture features, using any of the methods and designs disclosed above, the tablet device senses the drawing operation during the drawing process (via the data capture method such as a touch screen) and temporarily stores this data into a memory device (which can preferably be integrated into the device itself, or alternatively could be provided in an external device). Upon the activation of a capture switch, such as a push button (or continuously or at specified time intervals if automatic capture is desired) the device, or an external device, converts the data stored in the memory into a file that is also stored in memory to "capture" the current image. This capture process using a capture switch is like raking a snapshot of the current image for storage. Then, the user can continue to draw on the device to modify the current image, and, if desired, capture additional images by activating the capture switch. In this manner, the progressive changes to an image can be captured by the user. Of course, at any time the user can erase the current image, and start the process all over again.

In additional embodiments, time information might also be captured during the image capture. Thus, the time of each image capture might be stored with the image, or time may be associated with individual data elements from the data capture device. For instance, (x, y, t) data might be captured, with x being one linear dimension coordinate, y being a perpendicular linear dimension coordinate, and t being the time the coordinate is drawn or captured. By storing time information, an image or sequence of images might be redrawn in a proper order piece by piece (and perhaps mapped to an audio recording, such as to recreate a presentation or lecture, for example), or an animation created by the image drawing process, or for some other purpose. In the case of a presentation or lecture synchronized with an audio recording, viewers could hear what the presenter was saying as they were writing each word, drawing each symbol in a mathematical formula, or drawing each line in an image.

Generally, as one draws on the drawing surface (using the proper stylus, if required), the touch screen interface tracks that drawing and streams drawing data to a processor, where the data is converted and stored in memory. For bitmapped file formats, such as BMP, PNG, or TIFF, the streaming data will typically be rendered to an image buffer in RAM. When the image is "captured" the data can be formatted and compressed as specified by the file format and committed to flash. For vector file formats, such as PDF, WMF, EMF, SVG, or CGM, the streaming data can be committed directly to flash or optionally compressed and stored in RAM to be transferred to flash later when the image is "captured". One method used for such storage is to utilize the vector graphics features of Adobe® Acrobat® as the compressed format that is stored into RAM.

Note that for embodiments using a specialized stylus (such as the inductive touch screen embodiment shown in FIG. 2 and discussed above), only when that stylus is used for creating the drawing is data (e.g., information about movements of the stylus on the pressure sensitive drawing surface) captured electronically. If an image is drawn in some other manner not using the specialized stylus, the capture process will fail to capture the image. Furthermore, if part of the drawing is done using the specialized stylus, but another part is drawn in some other manner, then only that portion drawn by the specialized stylus will be electronically captured. This feature can be used for special purposes, such as to capture images that are substantially different than images shown on the screen, for any number of reasons, such as to not capture an initial rough sketch of a drawing, for example. Similar functionality could also be implemented by providing a means to temporarily disable the touch sensor, such that something may be drawn on the screen without capturing it to memory even when using the specialized stylus, if desired. This could allow operation at a greatly reduced power level when drawing without image capture by powering down the touch sensor or putting the touch sensor into a low power mode.

In a preferred embodiment, the captured images are stored as Adobe® Acrobat® (pdf) files in a memory in the device. This is done by finalizing the Acrobat file when the capture switch is activated (adding any required overhead to the file) and then saving the file in the flash memory for later viewing or transfer by the user. In at least some preferable embodiments, this captured image cannot be reproduced on the drawing surface of the device subsequent to the original image being erased, and thus must be transferred to another device for viewing. Such a device without reproduction capability is greatly simplified, as the drawing surface need not incorporate display reproduction capability which would add cost, complexity, and mass. In this regard, the electrically conductive layers on either side of the liquid crystal layer are unpatented, i.e., extend continuously across an entire viewing area of the liquid crystal display.

However, in other embodiments, the device provides the capability of displaying the image on the drawing surface by providing a means of electrically drawing images on the drawing surface, such as by using technologies for changing the state of the liquid crystal layer, such as disclosed in U.S. Pat. No. 5,889,566 or 5,644,330. Alternatively, the image might be "drawn" on the display by using technologies that will utilize the pressure sensitivity of the drawing surface, such as by utilizing piezoelectric effects, for example.

Figure 10:
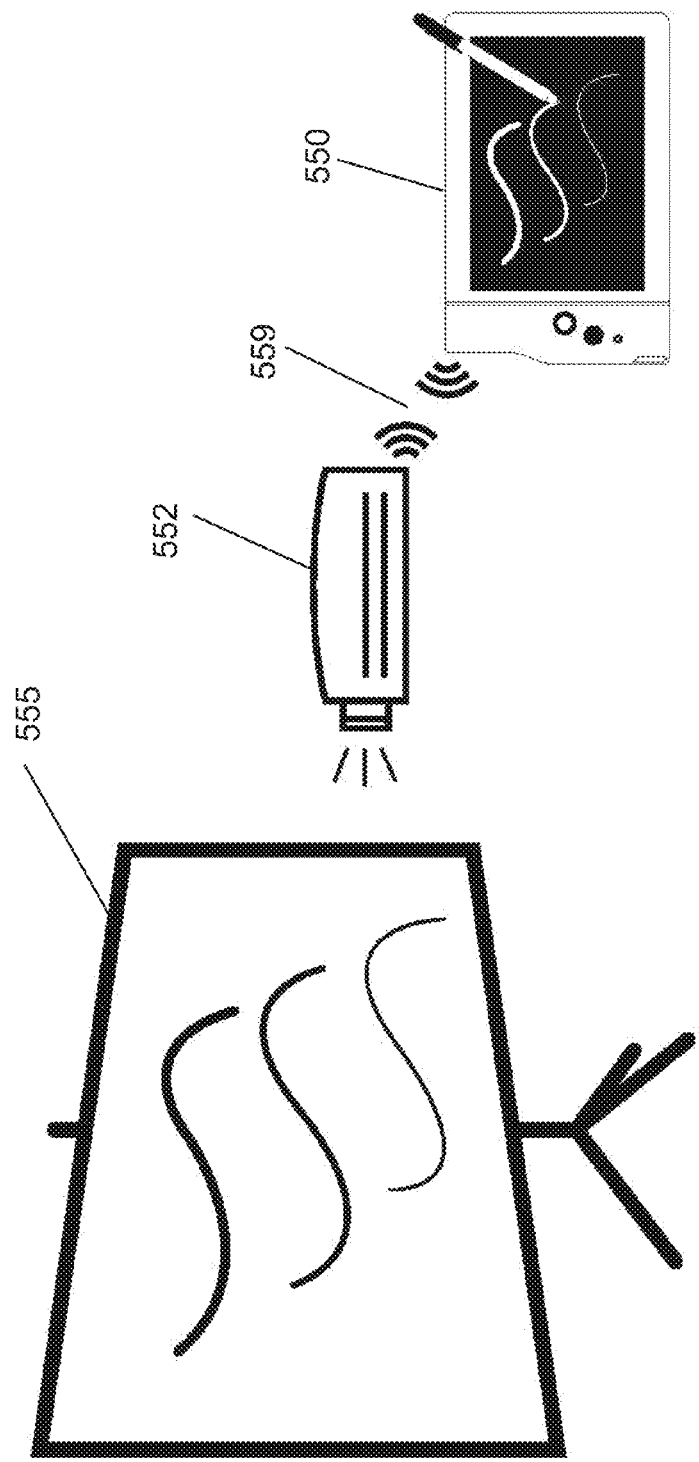
FIG. 10 shows a schematic of an example writing tablet with real-time or near real-time information transfer capability wirelessly connected to an external projector display.

The captured drawing (image) can be sent to a desktop PC, laptop, PDA, or cell phone via a wireless or a wire link (see FIGS. 7 and 10, described below). The flash storage on the device can be accessed on the remote device in a manner similar to how flash memory plugged into such a device is treated, e.g., it can be shown as a storage device and the stored Acrobat files accessed in the normal manner such files would be accessed. Several different designs for the inventive device to perform this function are described in more detail, hereinbelow.

Figure 4:
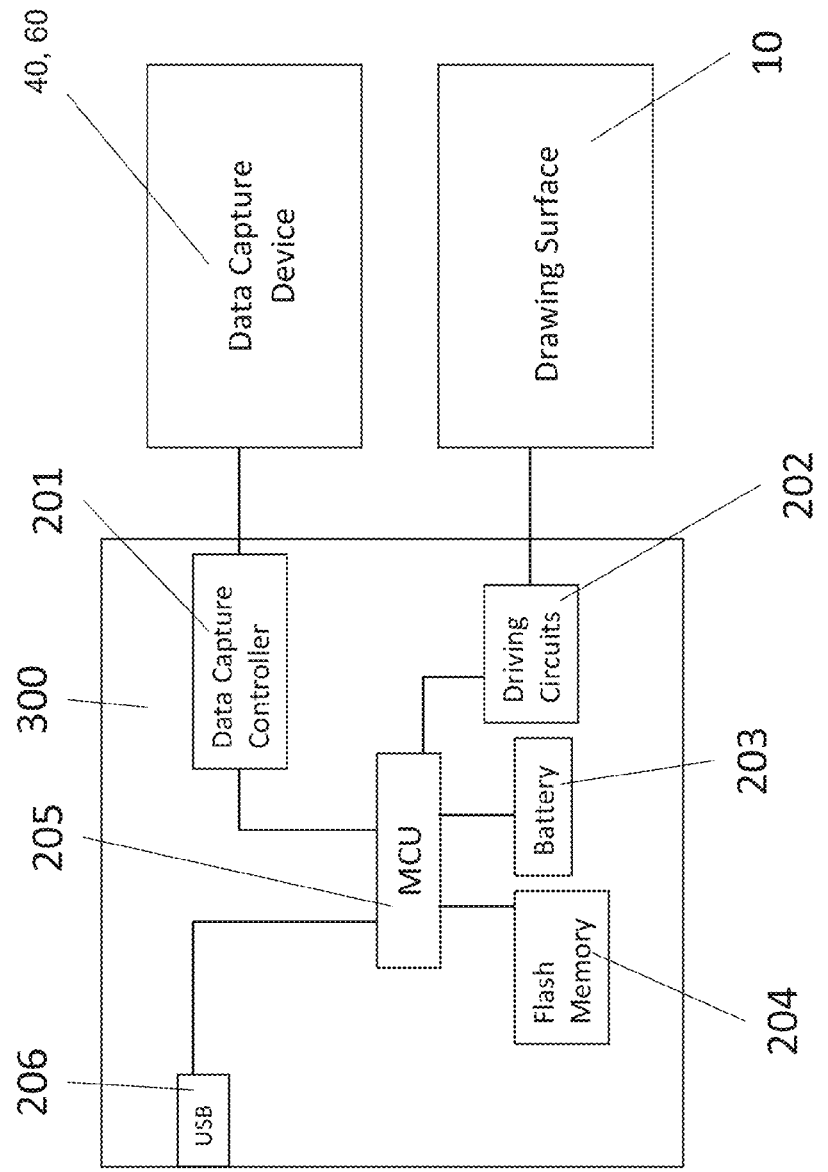
FIG. 4 shows block diagram for an example writing/drawing tablet with local memory.

With the consideration of the compactness integration, durability, low power, and convenience of use, any of the following embodiments of the tablet, among others, could be provided to capture the image drawn on the tablet on an external device:

The general design of an example embodiment that is compact and economical is shown in the block diagram in FIG. 4. It includes a writing/drawing surface 10, a data capture device such as a pressure (e.g., resistive) touch screen 40 or an inductive touch screen 60. Associated circuitry 300 includes a data capture controller 201 that receives the data from the touch screen 40 or 60 for providing (such as by streaming data) to a general purpose microcontroller unit, a general purpose MCU 205 having RAM, tablet drive circuits 202 for erasing images on the drawing surface 10 (as described in more detail, above), a rechargeable battery 203 for powering the electronics and erase function, flash memory 204 or other memory, and a USB port 206 for connecting to external devices, and for charging the rechargeable battery 203.

The flash memory 204 may be removable, such as by using a USB flash drive or other types of removable flash memory commonly used in the computer industry, such as compact flash, memory stick, MicroSD, MMC, etc. or an internal hard drive such as might be used in a laptop computer, for example. Alternatively, the memory 204 may be omitted, with the tablet relying on the memory of the external device connected via the USB, for example, to save on mass, power, and costs, in which case images could be streamed to the external device. However, this would likely require that the tablet device be tethered to the external device for most drawing operations to save drawing iterations, which may not be desirable in many circumstances.

The touch screen 40, 60 is integrated with writing/drawing surface 10 to form a combined writing/recording surface 50, 55 for the tablet, as illustrated in FIGS. 1 and 2, respectively. These components are then integrated together in housing to form the tablet (see, e.g., item 500 in FIG. 7). Writing or drawing on the drawing surface 10 is sensed by resistive data capture device 40, or inductive data capture device 60 (but only if drawn using the specialized stylus, where applicable), or alternatively by some other capture method, and the captured data is converted by the touch screen controller 201 into coordinate data that is streamed to and captured by the MCU 205. Typically, the image data is captured and stored in RAM on the fly until the user activates a switch to capture the image in the local flash memory 204 for storing an image, such as a pdf file as described in more detail, above. The image files may then be transferred an external device, such as PC, laptop, PDA, projector, or cell phone (discussed in more detail below) via the USB port 206. If appropriate, the flash memory 204 may be removed (such as an SD Card) to transfer data to an external device.

Figure 3:
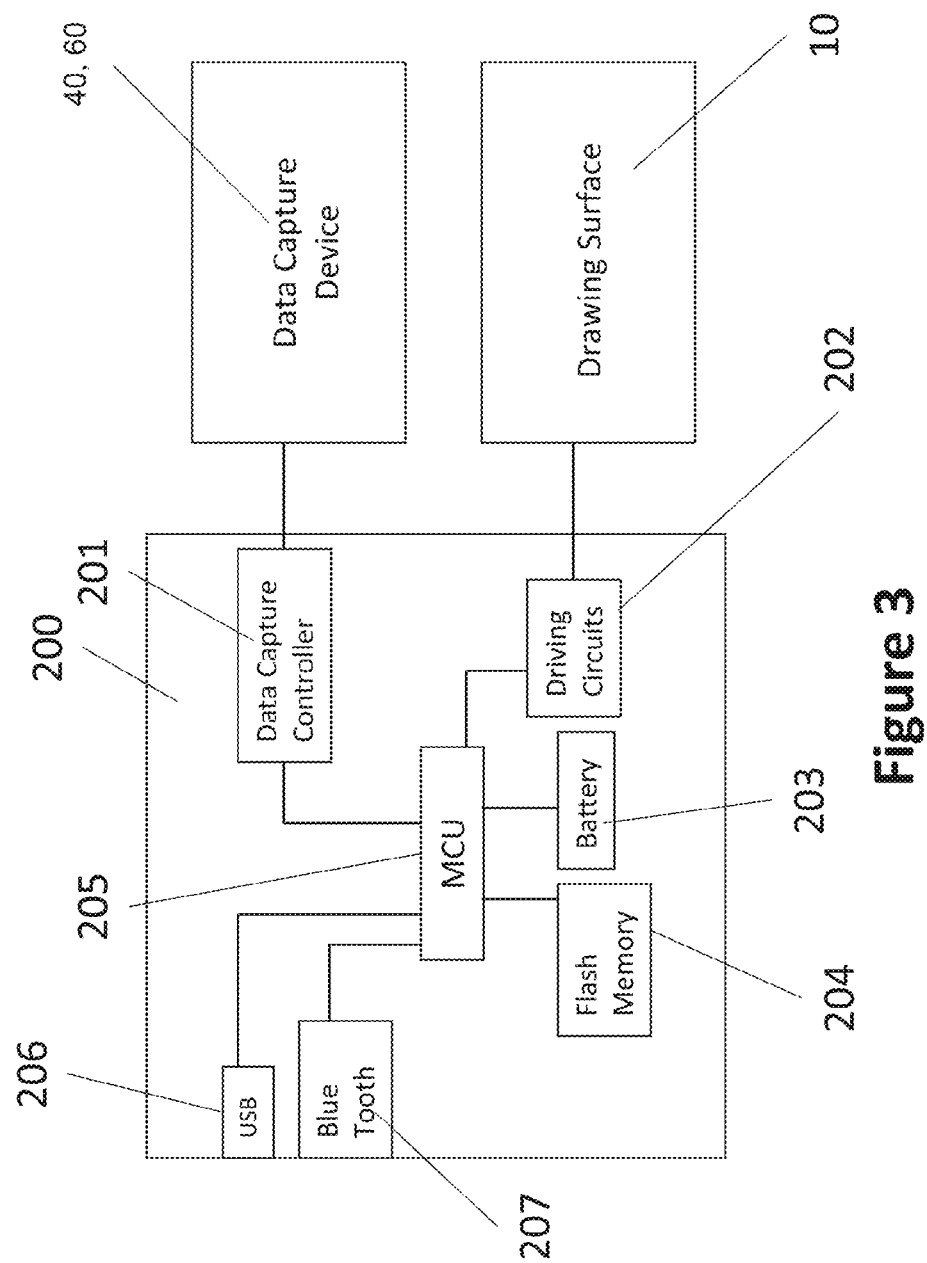
FIG. 3 shows a block diagram for an example writing/drawing tablet with dynamic data upload.

Another example embodiment is shown in FIG. 3 adding wireless capability, such as the Bluetooth interface 207 or a near-field communication (NFC) interface for very short range communications, such as to a cell phone or PDA. It includes a writing/drawing surface 10, a data capture device such as a pressure sensitive touch screen 40 or an inductive touch screen 60, and associated electronic circuitry 200. A Bluetooth port 207 can be used for connecting to external device, such as PC, laptop, PDA or cell phone (not shown). Alternatively, an NFC interface can be used to connect to an external device. The NFC interface could be used in place of Bluetooth, or to complement it by automating the steps of enabling, pairing, and establishing a Bluetooth connection. The latter case takes advantage of the higher data transfer rates of Bluetooth vs. NFC while simplifying the Bluetooth setup for many users. Alternate circuitry 200, as shown in FIG. 4, can be provided without external wireless capability to simplify the device even further.

Furthermore, the images stored in the memory might be replayed by the tablet through an external display (e.g., a projector), or an additional review/preview display integrated with the tablet. For example, a scroll button could be provided that will scroll through the stored images and redraw them on the external or preview display, without downloading the entire set of images.

Figure 5:
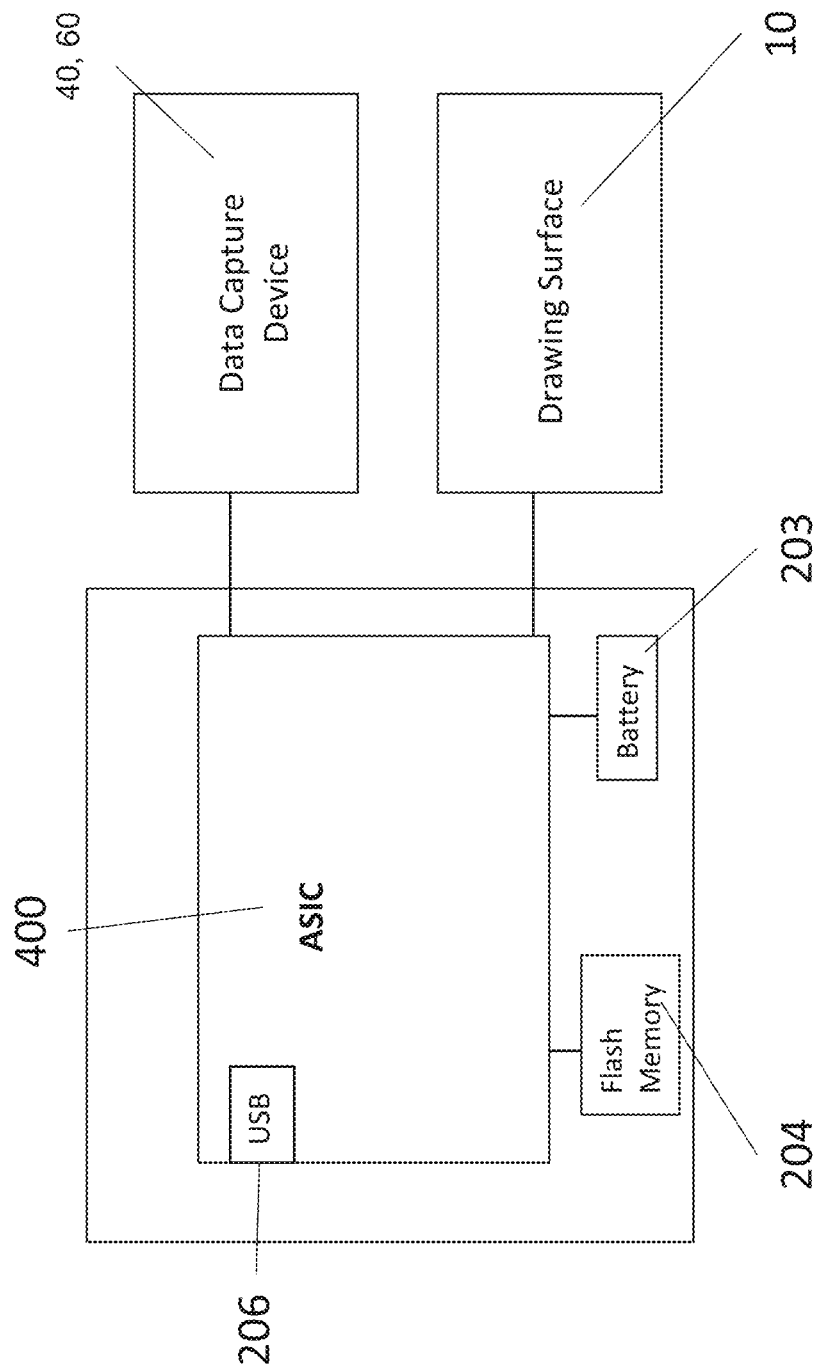
FIG. 5 shows a block diagram for an example writing/drawing tablet with an ASIC.

To further reduce the cost and improve reliability, the MCU 205, USB port 206, touch screen controller 201, and driving circuits 202 can be replaced with one customized integrated circuit 400 (ASIC), as illustrated in FIG. 5.

Figure 6:
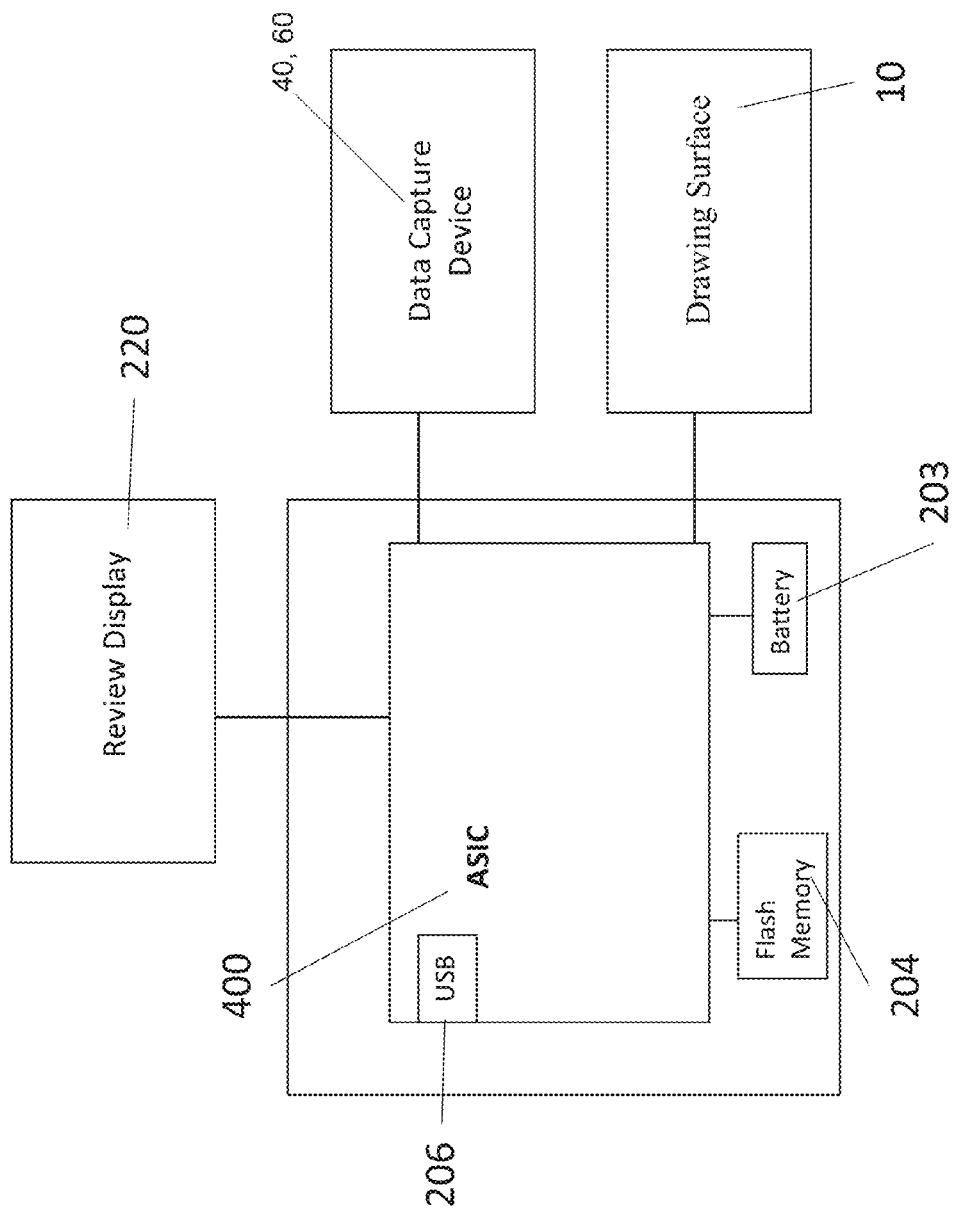
FIG. 6 shows a block diagram for an example writing tablet having an additional Review Display.

A display 220 can be added to any of the embodiments of the device, such as a small format display (such as 2.5" TFT, for example), for page review/preview, such as is illustrated in FIG. 6 for the ASIC embodiment of FIG. 5. Such a display could also be used to scroll through the images stored in the tablet. Other display options include larger format TFT display sizes, emissive displays, and ePaper displays, including but not limited to electrophoretic, electrowetting, microfluidic, and bistable liquid crystals such as cholesteric. In the case of a drawing surface 10 that may be made transparent except where written on by the stylus, the drawing surface 10 may be placed directly on top of, and optically coupled to, the display 220 such that the display 220 is viewed through the drawing surface 10. This provides for a compact device in which the review display 220 may be as large as the drawing surface 10. The review display 220 is not limited to displaying content recorded from the drawing surface 10, but could be used for displaying other content such as photographs, books, videos, etc. The review display 220 may also be used to provide a template, such as lined paper, a form, a test, or a basketball court, behind the drawing surface 10. In such a system, it would be possible to save composite images produced by combining the template with the data captured on the drawing surface. A drawing surface 10 comprising a cholesteric LCD without backpaint is suitable for such applications. Thus, a more functional tablet with the display 220 can be provided in alternative embodiments.

The battery 203 in FIGS. 3, 4, 5, and 6 in the design could utilize a rechargeable Li-Poly battery (or other rechargeable technology) and/or solar cell, which could be used for charging an additional rechargeable battery. The Li-Poly battery can be charged by a solar cell or by a USB port, for example. An example off-the-shelf IC for charging from the USB port is the bq24050 from Texas Instruments, described as an "800 mA, Single Cell Li-Ion and Li-Pol Battery Charger With Automatic Adaptor and USB Detection." Such a design might last for years without any changes or replacement parts.

Figure 13:
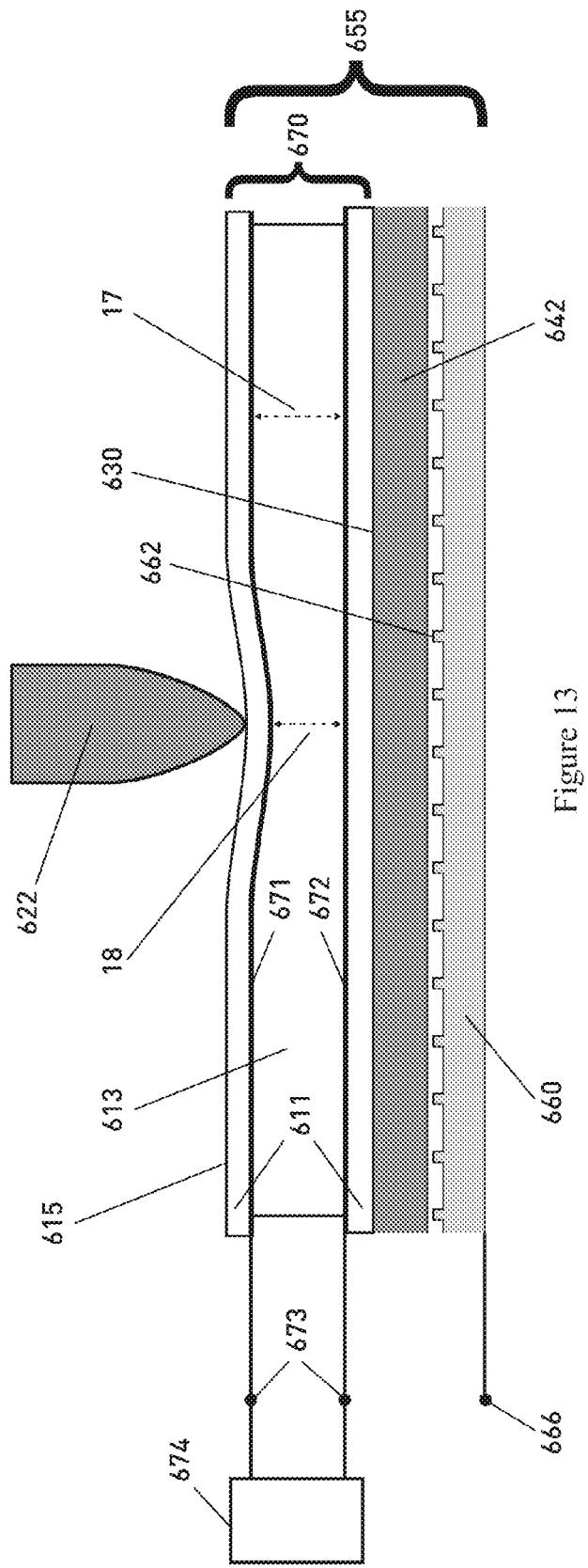
FIG. 13 shows a schematic drawing of an example embodiment of a writing/drawing tablet using an inductive touch screen and also having electronic display capability.

Embodiments Providing Additional Display Capability
Tablet Having Dual Imaging Display In an example embodiment shown in FIG. 13, a device that provides the capability of displaying electronic images on the drawing surface by providing a function of electrically addressing images on the drawing surface is disclosed. For such a feature, one option is to use technologies for electronically changing the state of the liquid crystal layer (as reviewed in "Cholesteric Liquid Crystals for Flexible Displays" Ed. G. Crawford (John Wiley & Sons 2005) J. W. Doane and A. Khan, Chapter 17). This example device has a two-fold function, one as an electronically addressed display providing a digital image and another as a writing tablet where an image can be drawn on the display using the pressure sensitivity of the drawing surface 615 with substrates 611 such as described elsewhere in this disclosure. The written image is further digitized for memory and further use. This is illustrated in FIG. 13 where the dual functioning display 670 serves as a pressure sensitive writing tablet addressed by the pressure of a pointed stylus 622 as well as a digital display addressed by the drive circuit 674 attached to electrode interconnects 673. Either both electrodes 671 and 672 or only one of these electrodes will be patterned, with the pressure sensitive cholesteric liquid crystal dispersion 613 being provided therebetween. In the case of a passively addressed display, electrode 671 is patterned in the form as rows while electrode 672 is patterned in the form of orthogonally oriented columns (as described in U.S. Pat. Nos. 5,889,566 and 5,644,330, incorporated by reference). Drive voltages are placed on the electrodes 671 and 672 either with a bipolar waveform (as described in U.S. Pat. No. 5,644,330) or a unipolar waveform (as described in U.S. Pat. No. 5,889,566). Furthermore, drive circuit 674 may serve to erase the image created by the pressure of the stylus 622. In the fully integrated device 655, the dual functioning display 670 is combined with a touch screen 660 for capturing the image written by the stylus 622 on the device. An optional planarization layer 642 occupies the space between the display and the touch screen. In order to provide contrast to the image on the display 670, there is an opaque or semitransparent layer 630 between display 670 and the following touch screen components. The next component when using an inductive touch sensor is the optional planarization layer 642. However, alternative embodiments could use other types of touch sensors, which can be as has been described earlier for similar components.

Alternatively the electrode 671 may be unpatterned and electrode 672 patterned (or vice versa) and processed in the form of an active matrix (such as described in U.S. Pat. No. 6,819,310, incorporated by reference). In this case, drive circuit 674 provides voltage waveforms (such as described in the U.S. Pat. No. 6,819,310) to electrode interconnects 673. The dual functioning electronic display and pressure sensitive writing display is integrated with a touch screen 660 having wire grid 662, electrodes 666, separator sheet 642, and light absorbing layer 630, such as described above.

There are many advantages of the integrated dual imaging device with data capture 655. The display may be electronically addressed with a template on which the user may hand write images. The template may be a form in which the user hand writes answers in the blanks of the form and the result captured. It may be the diagram of a football field or basketball floor where the user (coach) hand draws plays for the players on the template. Alternatively, the template may be something simple such as parallel lines to aid the user in writing text such as a lined tablet. The image of the template may be saved with the captured hand written image in a final composite image. Another potential application of the dual functioning device could be an interactive reader whereby a student electronically downloads text or figures and the student underlines important concepts in the text or makes additions to the figures. The handwritten changes can then be captured by the student and saved for further study. Many other applications can come from this dual functioning device.

Tablet Having Separate Electronic Display

Figure 14:
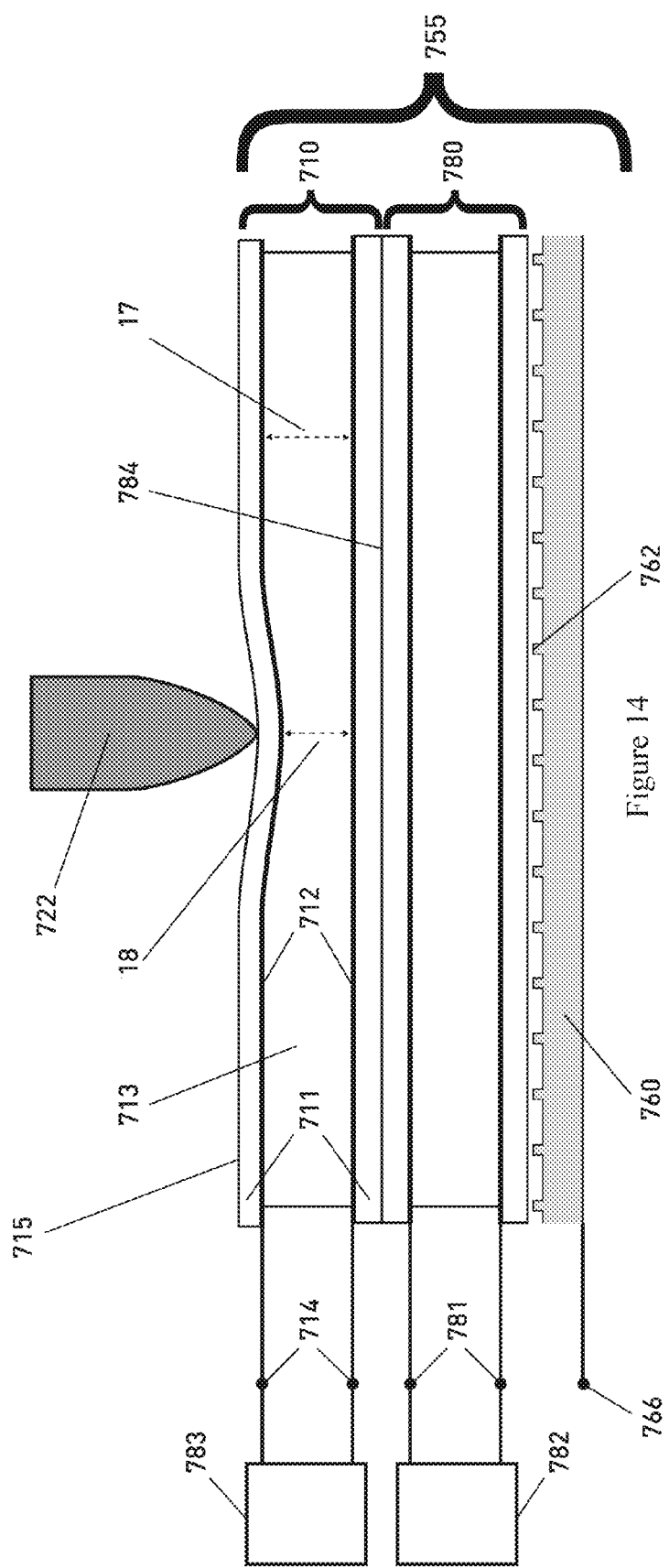
FIG. 14 shows a schematic drawing of an example embodiment of a writing/drawing tablet using an inductive touch screen with integrated separate display.

In a related embodiment, digital images stored in memory or digital images from another source might be displayed through an external display or a display integrated with the tablet, such that images can be displayed through the drawing/writing surface, for example. FIG. 14 illustrates a device 755 consisting of a writing tablet 710 with writing surface 715, substrates 711 pressure sensitive cholesteric liquid crystal dispersion 713, and electrodes 712 integrated with an electronically addressed digital display 780. Display 780 is preferentially a reflective display, the preferred technology being an electrophoretic display (such as described in U.S. Pat. No. 5,930,026, incorporated by reference) or a cholesteric display (such as described in the book "Cholesteric Liquid Crystals for Flexible Displays" Ed. G. Crawford (John Wiley & Sons 2005), incorporated by reference). Other reflective displays technologies known in the art may also be used, as may emissive or backlit displays. The digital displays 780 are electronically driven with drive circuit 782 coupled to the electrodes of the display with interconnects 781. Underneath display 780 is a touch screen 760 having wire grid 762, and electrodes 766, such as described above, the preferred technology being an inductive touch screen or a resistive touch screen. The cholesteric writing tablet 710 is addressed with the pressure of a pointed stylus 722 and erased electronically with an erase circuit 783 (with interconnects 714) using waveform that drives the planar texture to the focal conic texture (such as described in U.S. Pat. No. 5,889,566 or 5,644,330). The interface 784 between the writing tablet 710 and the electronic display 780 is a material to match the refractive indices of two devices at their interface or it may be a semitransparent optical filter to enhance the contrast of the written image on the tablet (such as described in U.S. patent application Ser. No. 13/477,638 filed on May 22, 2012, incorporated herein by reference). In this embodiment, the advantages are similar to the previous embodiment where the display may serve as a template for the tablet with the written image on the tablet being captured. The written image may be saved to a file by itself or as a composite image that combines the written image with the template. That image or a previous image from memory may be replayed on the tablet.

Note that for either of these examples, any of the components analogous to those described above (for the tablet designs without electronic display capability) might use designs similar to, or the same as, those described in the sections above. The images electronically drawn on the display might be taken from images that were previously captured by the tablet and stored internally (or stored externally), or that are otherwise provided for display, such as by an external device, for example, or in a networked system supporting multiple tablets, such as is described below.

Example Device Applications

Figure 7:
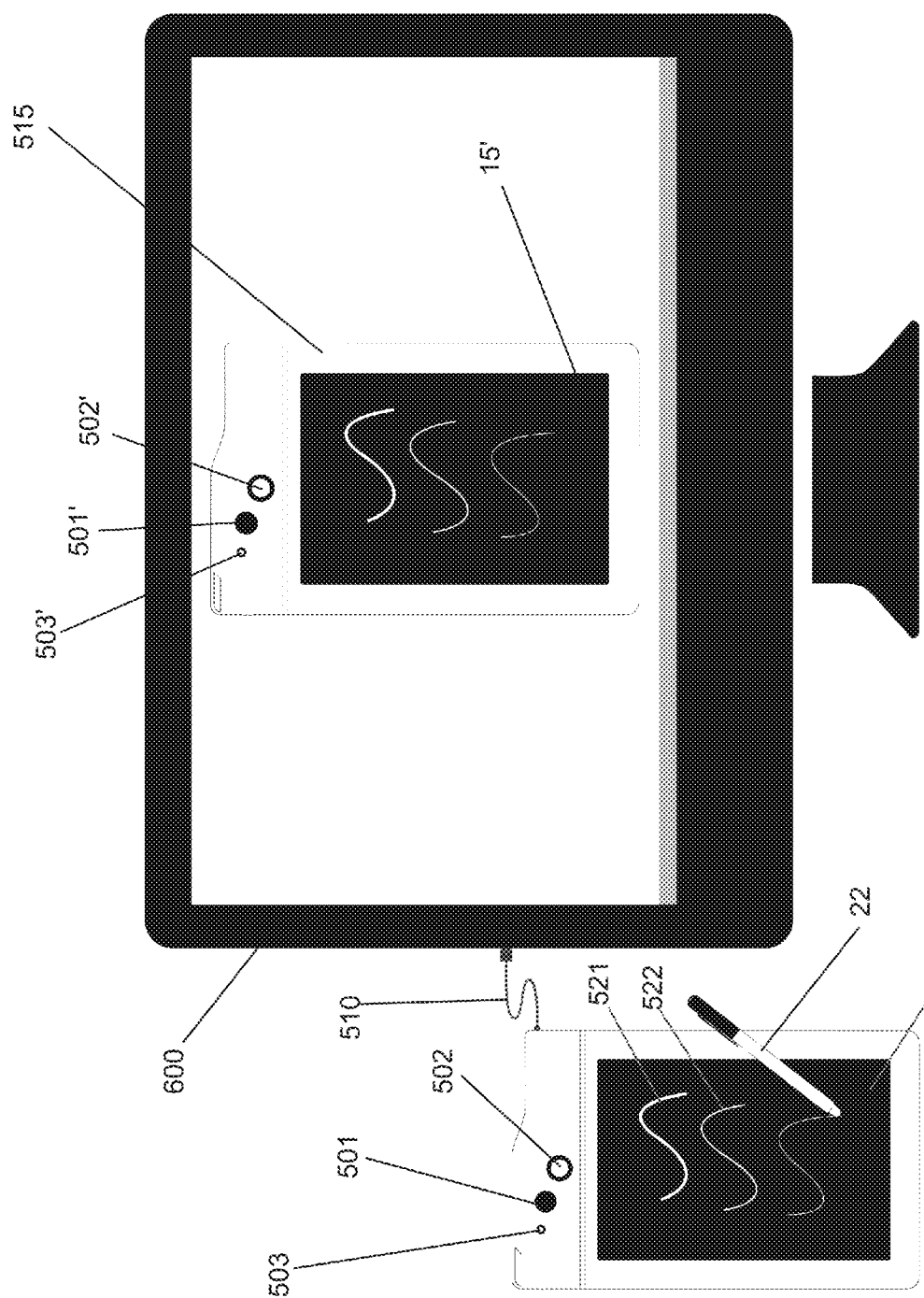
FIG. 7 shows a schematic of an example writing tablet with information transfer capability connected to a user computer.

FIG. 7 shows an example drawing device tablet 500 with capture capability that is connected to a computer 600 via USB interface 510. The user draws on the external writing surface 15 of the tablet 500 using the specialized stylus 22, that might be using an inductive touch screen capture capability. This example drawing tablet 500 has two interface buttons, an erase button 501 and a capture/wake button 502. Indicator 503 lets the user know both when the device is active (such as by a steady glow), and when the device is capturing an image (such as by flashing, for example). In order to save power, the device has a sleep mode where it will shut down the touchscreen and capture electronics in order to reduce power consumption. The user can wake the device by pressing the capture/wake button 502. Also, when the user wants to capture the current image on the device, the user can push the capture/wake button 502 to trigger the capture process. A lock switch can also be provided that will lock the image on the drawing surface so that it cannot be erased until the lock switch is released. Of course, separate buttons could be used for the capture and wake functions, if desired. Note that variable line widths are shown on both the tablet 500, and the virtual display 515, which are provided in a manner as discussed in more detail hereinabove.

On the computer 600, an application can be provided that allows the user to see in real-time (or near real-time such that the delay time is unnoticeable or negligible) on virtual screen 15' the same image that is being drawn on the drawing device 500 (as long as the image is drawn using the specialized stylus 22), as shown by the graphical representation 515 of the device 500. The virtual erase button 501' and virtual wake/capture button 502' can be made to operate in the same manner as the corresponding physical buttons on the device 500 by activating the virtual buttons using a mouse cursor, for example. Thus, the application running on the computer 600 can control a functionality of the actual drawing device 500, such as commanding it to erase the drawing surface 15 at the same time the virtual screen 15' is erased. The virtual indicator 503' can give the user an indication of the device operation in a manner similar to the indicator 503.

Alternatively, rather than drawing the image on the computer 600 in real time, the tablet 500 could instead have the computer 600 draw the image only after the capture button 502 is pushed to capture the image. Such functionality could be made user selectable on the tablet 500 or the computer 600.

Additional features that can be provided on the computer interface include allowing the view and other settings of the virtual device 515 to be adjusted, such as by using a pop-up window. The computer interface can also be used to configure the drawing device 500. For example, the clock used by the file system in the device may be set such that new image files may have a creation timestamp associated with them. Additionally, the drawing device 500 may be configured to directly save images in a preferred format, such as PDF, WMF TIFF, BMP, SVG, cgm, PNG, or JPG. Another interface window can be used for the user to select whether to locally save the image on the virtual screen, or to email the image using an email application, or to perform some other function with the image. Such other functions could include uploading the image to a social networking site such as Facebook or Twitter. It could also include uploading the image to a service such as Evernote, which can automatically synchronize your notes across all of your computing devices such as smartphones, personal computers, tablet computers, etc., or importing it into Microsoft OneNote, which offers similar functionality to Evernote. The image files stored in the flash memory of the tablet device 500 may be accessed for copying, opening, deleting, etc. as are files on any removable disk.

An application running on the computer (such as could be provided for installation with the drawing device 500, or be made available for download) can provide a system tray for easy accessibility to the various functions of the device, including a battery capacity indicator for showing the available capacity of the rechargeable battery of the device 500 and a device icon. An indicator showing when the device is not connected can also be provided.

Note also that a color drawing feature described in the cited applications could also be utilized for a drawing tablet with data capture. Also, selective erasure of portions of the drawing also described in that application, could also be utilized for the tablet with data capture features.

The tablet device is thus made useful as a drawing device on a PC, because it is easier to draw with a stylus while looking at the pressure sensitive display than it is to draw on a tablet device while looking up at the PC monitor. Hence, providing a localized image on the drawing surface provides a distinct advantage over devices that cannot do so.

Furthermore, the connection can be adapted for using the stylus for general mouse functionality, such as dragging and dropping rather than drawing, in which case it may not be desirable to see such actions drawn on the drawing pad. Hence, the device may have more than one mode of operation. In a first mode of operation, images drawn on the drawing surface, such as with the specialized stylus, are displayed on the surface. In another mode of operation, in order to prevent such actions from drawing on the drawing pad, the drawing surface could first be erased and then the select erase functionality (described in more detail below) would be kept in an enabled state. Such functionality could be actuated using a switch on the device, or by entering a mode of operation on a menu command. In such a mode of operation, everything drawn by the stylus will match the background color and thus not be visible (i.e., it is continuously erased while being drawn). Depending on the mode of operation, a voltage may be required across the drawing pad electrodes while the select erase functionality is enabled. Alternatively, a higher voltage waveform could be continuously applied to the drawing pad electrodes that erase the entire drawing surface to the focal conic (dark) state, or a yet higher voltage waveform that holds the liquid crystal of the entire drawing surface in a homeotropic state could be used.

The tablet device can thus have a dual usage. It may function as an input device for drawing or controlling a cursor when connected to a computer (in which case images may, or may not, be desired for display on the drawing surface) or the tablet may operate as a note taking/drawing device that stores images in onboard memory when not connected to a computer. This contrasts to single usage devices, such as graphical input tablets which only function as input devices to computers or pen and paper based electronic note taking systems that record notes but aren't useful as computer input devices.

Also, a low-cost device that is always tethered to a PC could omit the battery and flash for an additional example embodiment.

Select Erase Capability

U.S. patent application Ser. No. 12/787,843, filed on May 26, 2010, and incorporated herein by reference, discloses a design for a multi-color dual-mode drawing pad 10 that allows for selective erasure of drawn images, rather than requiring erasing the entire image as discussed above. In this design, a "mode A" is provided where using pressure of a pointed stylus, an image is drawn on the pad via the liquid crystal in the focal conic state against the background liquid crystal in the planar state, and a "mode B" is provided where, using pressure, a color image is drawn on the pad via the liquid crystal in a planar state against the background liquid crystal in the focal conic state. Mode B may be considered as the negative image of Mode A. In the above described embodiment without selective erase, the primary mode of operation is mode B.

This multi-mode approach can be used in another example embodiment of the instant device by using only two colors, a foreground color and a background color, to both draw and erase images on the drawing pad. In such a device, portions of a drawing displayed on the drawing pad that was drawn using one mode can be erased by changing the mode of operation to the other mode, and then writing the background color over the drawing, essentially erasing the drawn image as described in more detail in U.S. Pat. No. 8,139,039

Hence, for example, a device using the dual-mode operation may operate for normal drawing in mode B, which requires no voltage across the drawing pad (i.e., across the liquid crystal via electrodes 12 of writing tablet 10 of FIGS. 1 and 2) during the drawing operation using pressure, such as via the tip of the stylus. Since this reduces the power consumption during the drawing process it is normally the preferred mode of operation.

However, if the user desires to erase a part of the displayed image, the drawing pad can be transitioned to mode A for selective erasure wherein voltage is applied to electrodes 12 of writing tablet 10 during the erasure process. This might be done by activating a push switch or other actuator provided on the device, or by activating some menu item or actuator on a remote device with which the tablet is connected, or by sensing some change to the stylus, or by activating a switch on the stylus, either of which can cause a change in the detected resonance circuit of the stylus, causing the tablet to change its mode of operation from mode B to mode A.

Then, the user can erase the desired portion of the displayed image by applying pressure to that portion of the image (such as by using the stylus eraser tip, or even the user's finger, for example). Essentially, the user is overwriting the drawn portion of the image with the background color, thereby erasing that portion of the image. The tablet can then be put back into mode B for further drawing. This can be done by using the manual actuator, or by sensing that the stylus has returned to the drawing tip orientation, for example.

Such a device would still have an erase capability for erasing the entire image, as described above. Generally, no voltage is provided across the liquid crystal for drawing during mode B, whereas a voltage must be applied across the liquid crystal when drawing in mode A, and hence power can be conserved by utilizing mode B for most of the drawing operation, which consumes no power at all (in contrast to mode A, which does consume power during the writing or erasure process. However, once an image is written or erased in Mode A, voltage to electrodes 12 of FIGS. 1 and 2 is not required to display the resulting image. The voltage put across the liquid crystal for selective erasure is substantially lower than the voltage used to completely erase the image (e.g., ~5V vs. ~20V).

Figure 8:
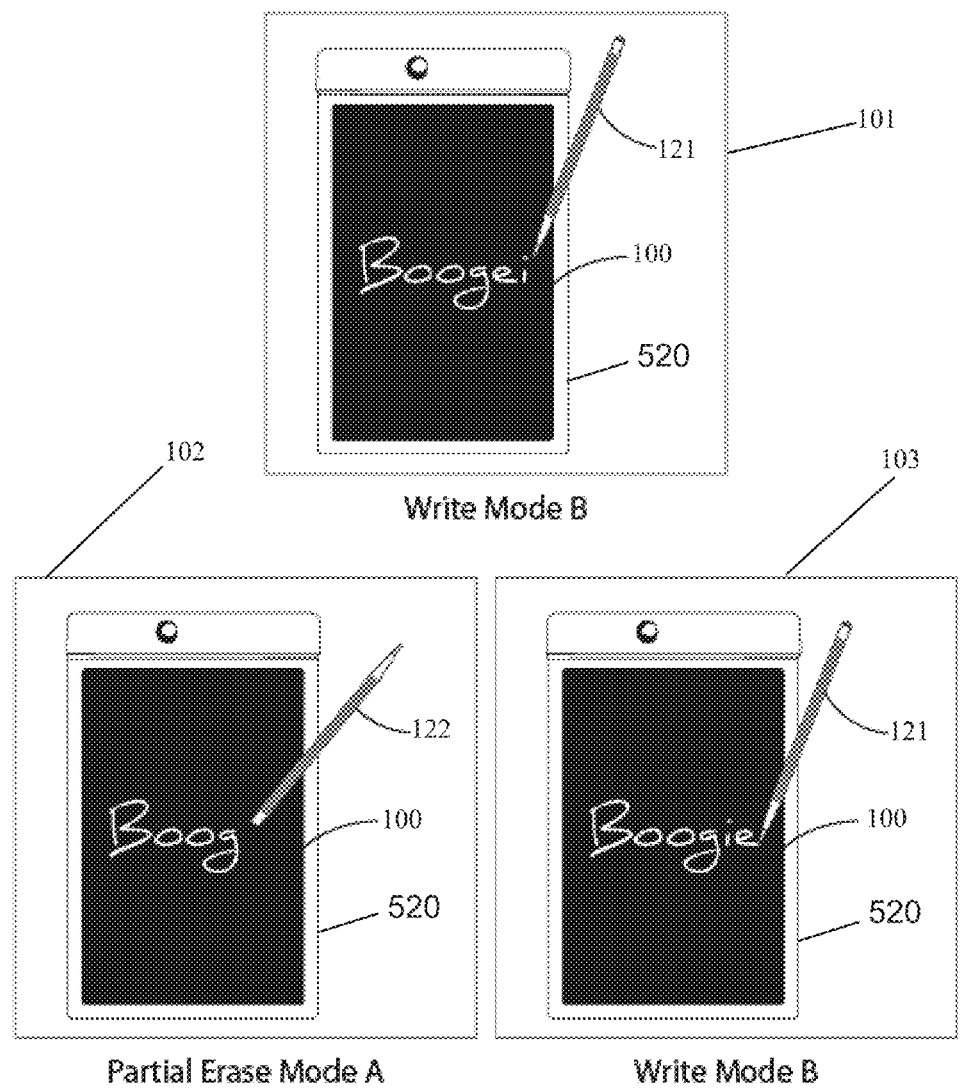
FIG. 8 shows a first example select erase function that can be provided on an example tablet.

FIG. 8 shows an example embodiment of a tablet 520 implementing this above described capability. In image 101, the normal mode B is provided for drawing on the tablet 100 using the stylus placed in such an orientation 121 that the drawing tip of the stylus is in contact with the tablet drawing surface. Image 102 shows the tablet transitioned to mode A for erasing part of the image using the erasing end of the stylus in orientation 122, and image 103 goes back to the normal drawing mode using the drawing tip of the stylus back in orientation 121.

Figure 9:
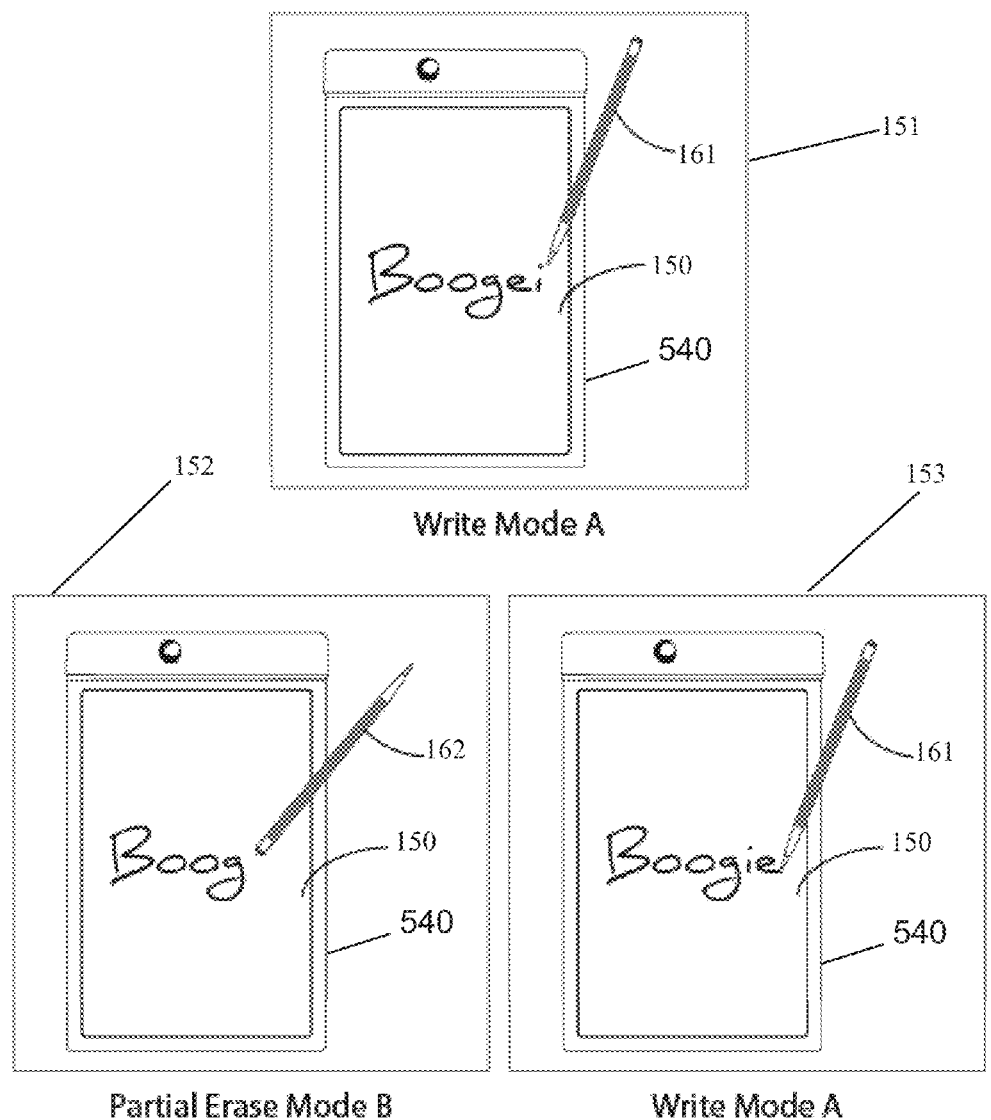
FIG. 9 shows a second example select erase function that can be generated on an example tablet

As an alternative, drawings could be done using mode A and erasures using mode B. FIG. 9 shows such an alternative example for a tablet 540. In image 151, the normal mode A is provided for drawing on the tablet 150 using the stylus placed in such an orientation 161 that the drawing tip of the stylus is in contact with the tablet drawing surface. Image 152 shows the tablet transitioned to mode B for erasing part of the image using the erasing end of the stylus in orientation 162, and image 153 goes back to the normal drawing mode using the drawing tip of the stylus back in orientation 161.

Such selective erasures can be captured electronically in a similar manner. Once the tablet knows that it is in an erasure mode, images drawn on the tablet that are sensed by the touch screen underlying the drawing pad, there are a number of ways to capture the erasure electronically. For example, erased portions of a "new" image in the background color can be used to overwrite the original image in the background color, thereby erasing the desired portion of the original image. This is particularly useful if the images are stored using vector graphics. Alternatively, if the original image is stored as a bitmap, either a new overwriting bitmap can be used, or the original bitmap can be modified to show the erasure.

The above concept can be modified such that the tablet can display images in color using multiple layers of liquid crystal, as discussed in the Ser. No. 12/787,843 application. In such embodiments, any of the layers could be independently operated in mode A or mode B, leading to a number of permutations of modes to allow for a very complex set of color drawing and erasing capabilities.

Input Device Applications:

Alternative embodiments of the tablet device described herein could be utilized such that the tablet device operates as an input device to support various products and services.

For one example, the drawing tablet device can be utilized as an input device for connecting to a computer for use in various computer applications. For example, the device might operate a curser as a mouse, digitizer, or trackball interlace, such that the drawing device can be used to select various computer functions, such as selecting menus and activation buttons, for example. Furthermore, the device could interlace with drawing software, such that rather than using a trackball or mouse, the user, such as using a cursor, for example, can draw using the drawing application. The user could select the current color in the application and then draw images using the cursor to utilize the drawing functions of the drawing software installed on the computer.

The drawing tablet device could even be adapted to allow for drawing lines of varying thickness. For example, by pressing harder on the drawing surface, the stylus is closer to the inductive touch pad of the tablet drawing device, and this closer position could be detected by the electrode grid as information related to the pressure applied to the drawing surface, and thus be translated into thicker lines. Another alternative including using a variable LC circuit in the stylus, such that pushing in a moveable tip on the stylus changes the resonance of the LC circuit (such as by changing settings on a variable capacitor, variable inductor, or variable resistor, for example), which can be also be interpreted as information related to the pressure applied to the drawing surface, and thus different line widths. Such a variable LC could also be used to modify functionality on the computer, such as a push in operating as a mouse click, and a lesser push in having a different function, for example. Alternatively, multiple styluses having different resonant frequencies could be utilized for different functions, such as for activating certain colors, line thicknesses, filling in shapes, etc.

Alternatively or additionally, the device might interpret the speed of the stylus across the drawing surface as indicating an intended line thickness, such that faster drawing speeds lead to thinner lines, and slower drawing speeds lead to thicker lines, for example.

The recorded line thickness may be tuned based on one or more of pressure, speed, or temperature to match the thickness of the line drawn on the display, as discussed in more detail above. For example, FIG. 7 shows thicker lines 521 and thinner lines 522 drawn in the tablet 500. In this example, the line thickness distinction is further reflected on the remote screen 600 as well, although this need not be the case for all embodiments. Similar thickness differences are shown in FIG. 10 as well with three lines of different thickness being shown on both the tablet 550 and the external screen 555.

As another alternative, the drawing tablet device could be utilized as an input device for providing presentations on computer screens, projector screens, tablets, electronic white boards, etc. such that a lecturer or other presenter could use the device for real-time or near real-time communication, much like a white board or chalk board can be used by a teacher for writing mathematical equations, for example. This is similar to the application shown in FIG. 7 and described above, except that the tablet would not necessarily write to a virtual version of the tablet, but would be used to write to the large display for viewing by the audience, as shown in FIG. 10, where the tablet 550 is shown wirelessly connecting 559 to the projector 552 for projecting an image on the screen 555 for displaying images drawn on the tablet 550 by the user directly on the screen 555. Such a system could be implemented using a Bluetooth wireless connection 559 between the tablet 550 and a computer (either inside or externally connected to) the projector 552, wherein the computer uses data from the device to generate the image displayed by the projector 552 on the screen 555.

In such an embodiment, it is desirable that the image drawn on the tablet 550 be displayed on the screen 555 in real time, or near real time, such that there is little delay in displaying the image on screen 555. To accommodate such real-time or near real-time display, it may be desirable to directly stream drawing data from the tablet 550 to the projector 552, as any intervening step, such as first storing the image in memory on the tablet, could interfere with the real-time drawing of the image on the screen 555. Note that variable line widths are shown on both the tablet 550, and the screen 555, which are provided in a manner as discussed in more detail hereinabove.

Hence, either the memory storage function could be completely eliminated in this embodiment, or the streaming of the drawing data to the projector 552 could be done prior to memory storage, or in parallel, so that no significant delay in the streaming of the data occurs.

Figure 11:
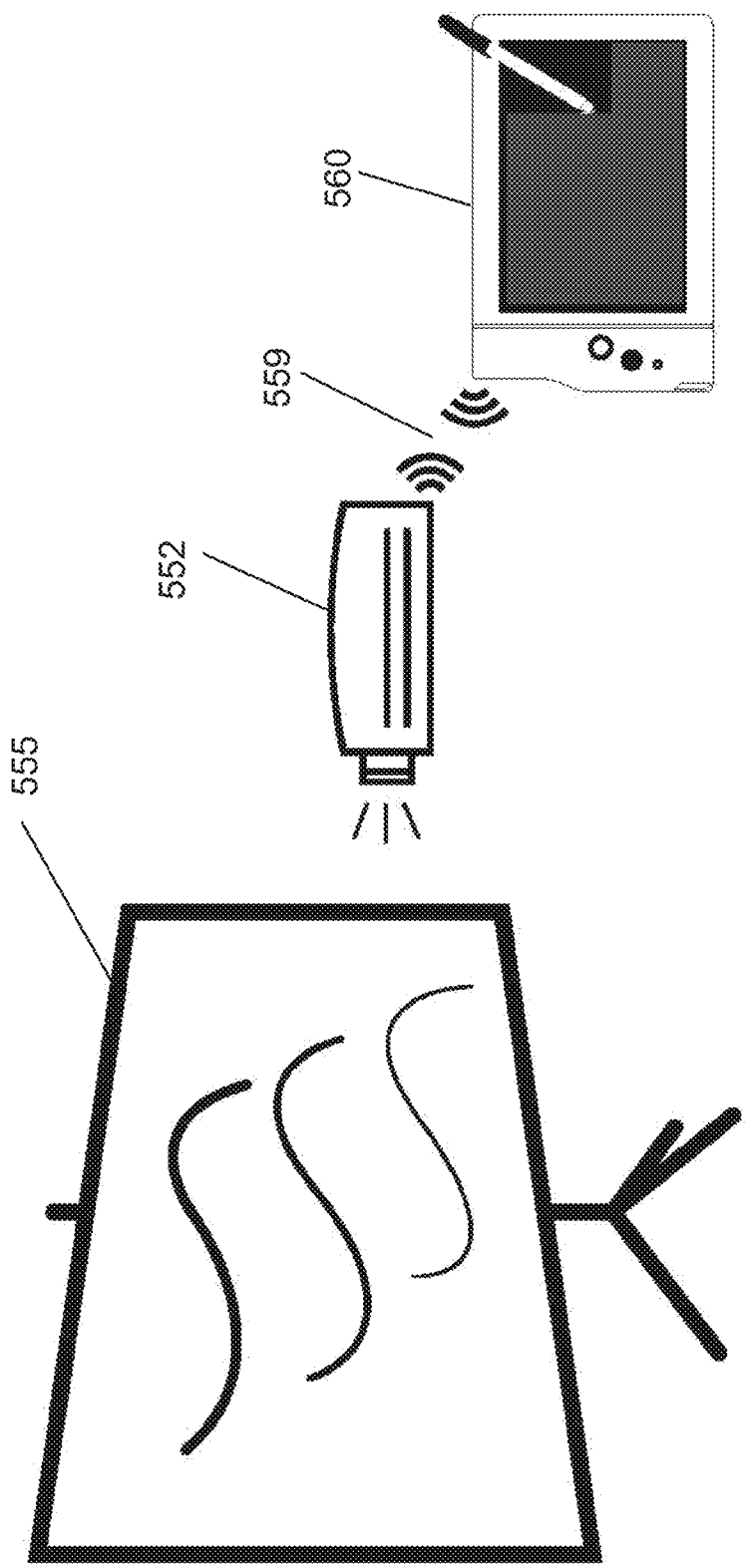
FIG. 11 shows a schematic of an example writing tablet such as in FIG. 10 but with a tablet having a mode of operation where images can be prevented from displaying on the tablet.

In an alternative embodiment shown in FIG. 11, the tablet 560 has a mode of operation where an image is not drawn on the tablet, as discussed in more detail above. In this example, the tablet 560 does not show the image being drawn by the stylus on the tablet itself, although the image is shown drawn on the screen 555. This mode might be activated by the user actuating a switch on the tablet 560, for example.

Figure 12:
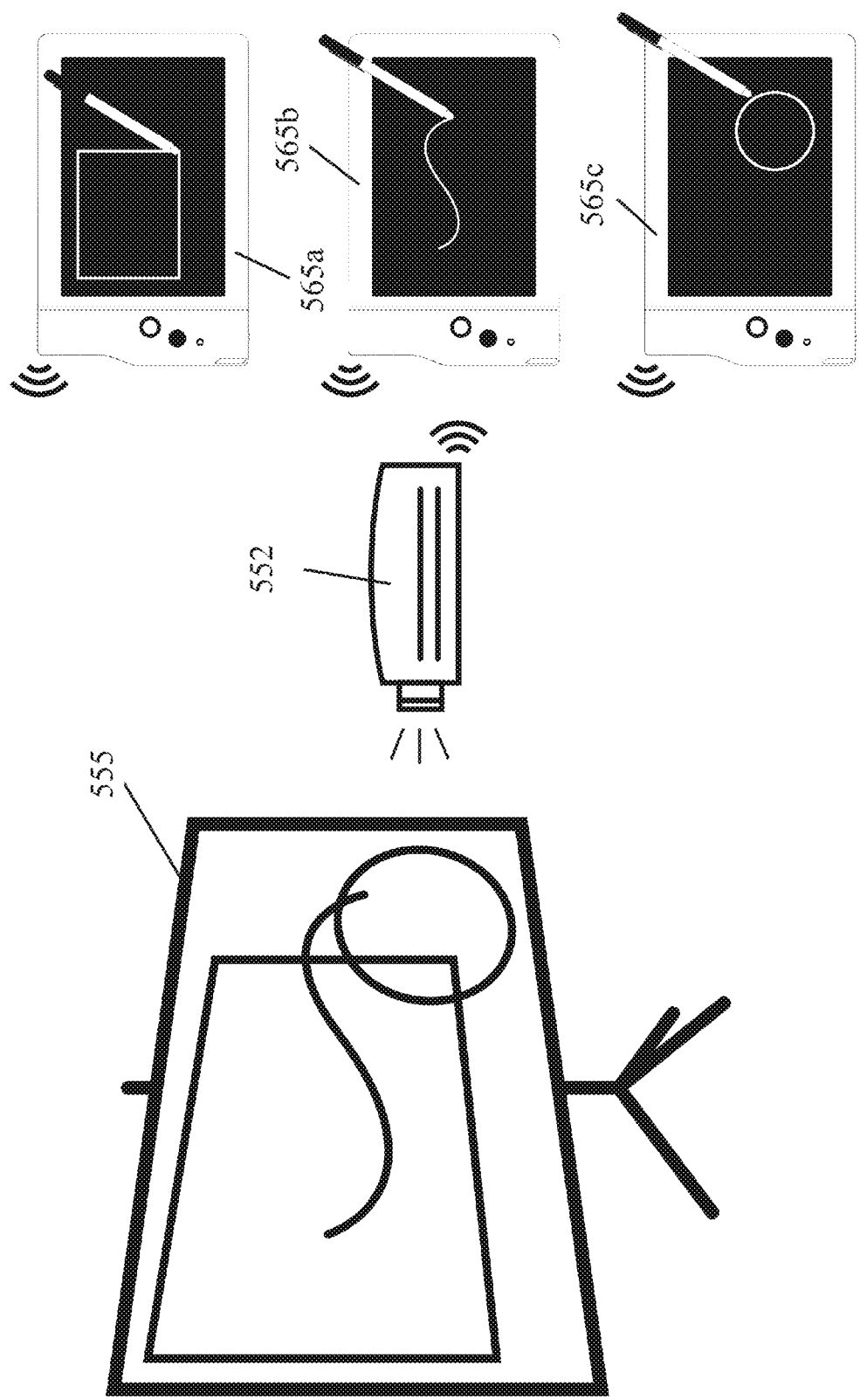
FIG. 12 shows a schematic of an example writing tablet such as in FIG. 10 where multiple tablets can be used together in a presentation.

FIG. 12 shows an example application where a plurality of tablet devices 565a, 565b, and 565c can be concurrently used for drawing images on a screen 555, with each tablet contributing a portion of the composite image shown on the main screen. This allows for collaboration among many different users. Applications where users may be remotely located, using the tablet devices as part of a conferencing capability can be similarly supported, where each user may have their own external screen showing the composite image. Of course, in applications where the tablet has an integrated electronic display (as described in sections above), the images drawn by others may be shown on each of the networked tables as well as, or alternative to, showing the composite image on a main display (or other display seen by remote users).

Such presentation formats using the above embodiment or alternatives thereof might include displaying such images on electronic whiteboards, televisions, or other display types. Furthermore, networked computers or remotely located projectors could be utilized, so that people in remote locations can view the results on local monitors or screens, such as supporting videoconferencing, for example. The advantage of having a local screen for the presenter is that the presenter can see the image on the input device (the tablet) as it is being drawn, and thus more easily continue where they left off, a shortcoming of many existing products. In a videoconference, if more than one user is equipped with a drawing tablet device, they can collaborate on the whiteboard with each user drawing in their own ink color, for instance. Modifications of such a tablet might be to change the aspect ratio of the tablet to better match that of the display screen, or allow the tablet orientation to be changed based on the display screen.

Example Prototype with Additional Features:

A working prototype writing or drawing tablet device was constructed with wireless connectivity as illustrated in the block diagram of FIG. 3 with a Bluetooth interface 207 for short range communications, to an external processing device such as a smartphone, tablet, personal computer (laptops/desktops) netbooks or eReader. The external processing device can include a processor coupled to a non-transitory, computer-readable medium storing a capture application. The capture application is configured to receive image data, image files, electronic information representing movements of a stylus, etc.; to process, render, or analyze the data, files, or information received from the writing/drawing tablet; and to transmit the data, files, or information to other remote or local devices separate from the writing/drawing tablet and the external processing device. It includes a drawing surface 10, an inductive touch screen 60 for electronic data capture of electronic information representing a drawn image, and associated electronic circuitry 200. The working prototype incorporated a pressure sensitive writing/drawing surface adapted from the commercially available Boogie Board™ Rip writing tablet of Improv Electronics to include an ASIC processor and a pressure sensitive digitizer layer attuned to the frequency of a specialized stylus without batteries purchased from Hanwang Technology Co., Ltd. The working prototype includes various features discussed below.

The prototype can connect electronically (wired or wirelessly) to other external devices for inputting, storing, retrieving and sharing drawing functionality into the external device. Through the external device, the prototype tablet can send drawn images to other remote devices, such as via the Internet. In addition, through the external device, the prototype tablet can transmit images to Internet or cloud-based services to enable further sharing and/or synchronization of images across a plurality of devices.

The prototype, with a pressure sensitive data capture layer, was observed to collect xy position (e.g., position of the image on the tablet), pressure (e.g., information related to pressure applied to the display as the image is drawn) and additional data (e.g., drawing speed) from the interaction of a specialized stylus with the pressure sensitive surface, in order to match the line width of the image on the prototype writing tablet with the image on the connected external device display. The line widths can be matched or replicated on the external display based on the pressure data and/or the speed data. According to another aspect, the data capture layer many not directly sense a pressure applied. For instance, in the example of data capture layer based on a touch screen (inductive, resistive, etc.), an amount of pressure applied to the touch screen is not measured. However, an intensity of the contact or the magnitude of the contact (i.e., how hard the touch screen is pressed) can be measured based on the specific technology of the touch screen. For example, for an inductive touch screen, a capacitance load can be detected and utilized as magnitude information indicating an intensity of contact, since the capacitance load can increase as the pressure applied increases.

The prototype contains software (e.g., firmware) that can transfer all images produced on the writing tablet as soon as both the writing tablet and the external device are turned on. The transfer occurs when the writing tablet and the external device are connected wirelessly. For example, upon establishing communications (e.g., Bluetooth communications) with the external device, the prototype tablet automatically downloads stored image files to the external device. That is, the tablet downloads the stored image files without receiving a corresponding transmit command from a user of the tablet/external device. Moreover, the stored image files can represent a plurality of separate images drawn upon and captured by the tablet. One or more image files can be transferred from the prototype tablet to multiple external devices, from multiple tablets to a single external device, or from multiple tablets to multiple external devices.

After images (e.g., image files or raw image data in real-time) have been transferred from the prototype writing tablet to an external device, the user can subsequently upload the images as files to the cloud/Internet. Users can share this information via popular telecommunications and social media technologies, including email, Twitter, Evernote and Facebook.

The prototype writing tablet can automatically transfer anything written on the writing surface with a specialized stylus to the external device. Once the prototype writing tablet and the external device are both turned on, they can connect to each other, such as via Bluetooth (piconet network topology) and the writing tablet can transfer the image data to the connected external device. The external device, in turn, can automatically forward the image data to a remote device, such as a remote web server. The external device could also automatically forward the image data to a predefined designated location in the external device (e.g., a designated folder) or to another external device, such as a tablet or laptop computer. In an example embodiment, the tablet creates a file recording the image data that is transferred to the external device. The format for the file can be a document file format that can be accessed by available software for accessing images (e.g., Adobe .PDF file). At the time the user completes the image on the writing tablet they can save the image and send it to the external device. In another example embodiment, the prototype writing tablet creates and sends to the external device, in real time or near real time, electronic information representing the image, including x,y (location information) and pressure data (magnitude information indicating a degree of contact), and optionally writing speed data. The location information and magnitude information can be collected on the basis of strokes of the stylus. For example, the location information and magnitude information can be formatted as a digital ink file, using an ink markup language or other suitable format. Software, i.e., the capture application, on the external device graphically renders in real time the image as it is created by the user on the writing tablet.

The image that is automatically transferred between the prototype writing tablet and the external device can appear on the external device in the same light colored lines on a dark background as it appears on the writing tablet, or in other configurations of line color and background color. For example, the image can appear on the external device as dark lines on a white background that mimics the appearance of dark ink on white paper.

The user can use software on the external device to change the appearance of the rendered image (such as line color, background color, templates) and these changes will appear and be rendered in real-time in the image on the external device.

Figure 15:
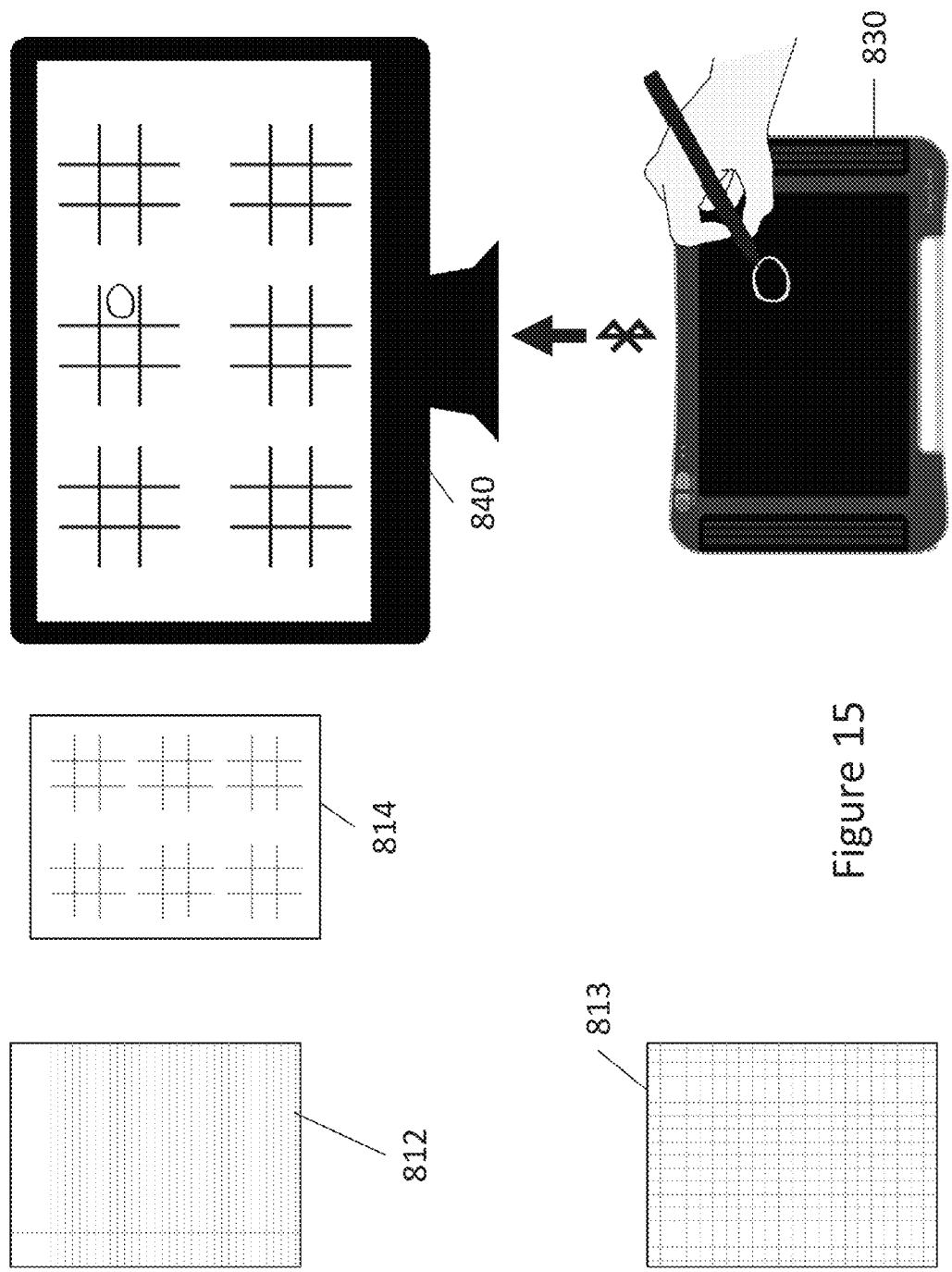
FIG. 15 shows examples of the prototype writing tablet's software templates.

The software can include templates for users to add to images on the external device. FIG. 15 presents examples of these software templates which include formats familiar to users, such as lined paper 812, graph paper 813 and tic-tac-toe grids, 814. An illustration of the prototype writing tablet, 830, illustrating the use of the tic-tac-toe template is shown on the monitor of a PC, 840, connected via Bluetooth to the prototype writing tablet.

Figure 16:
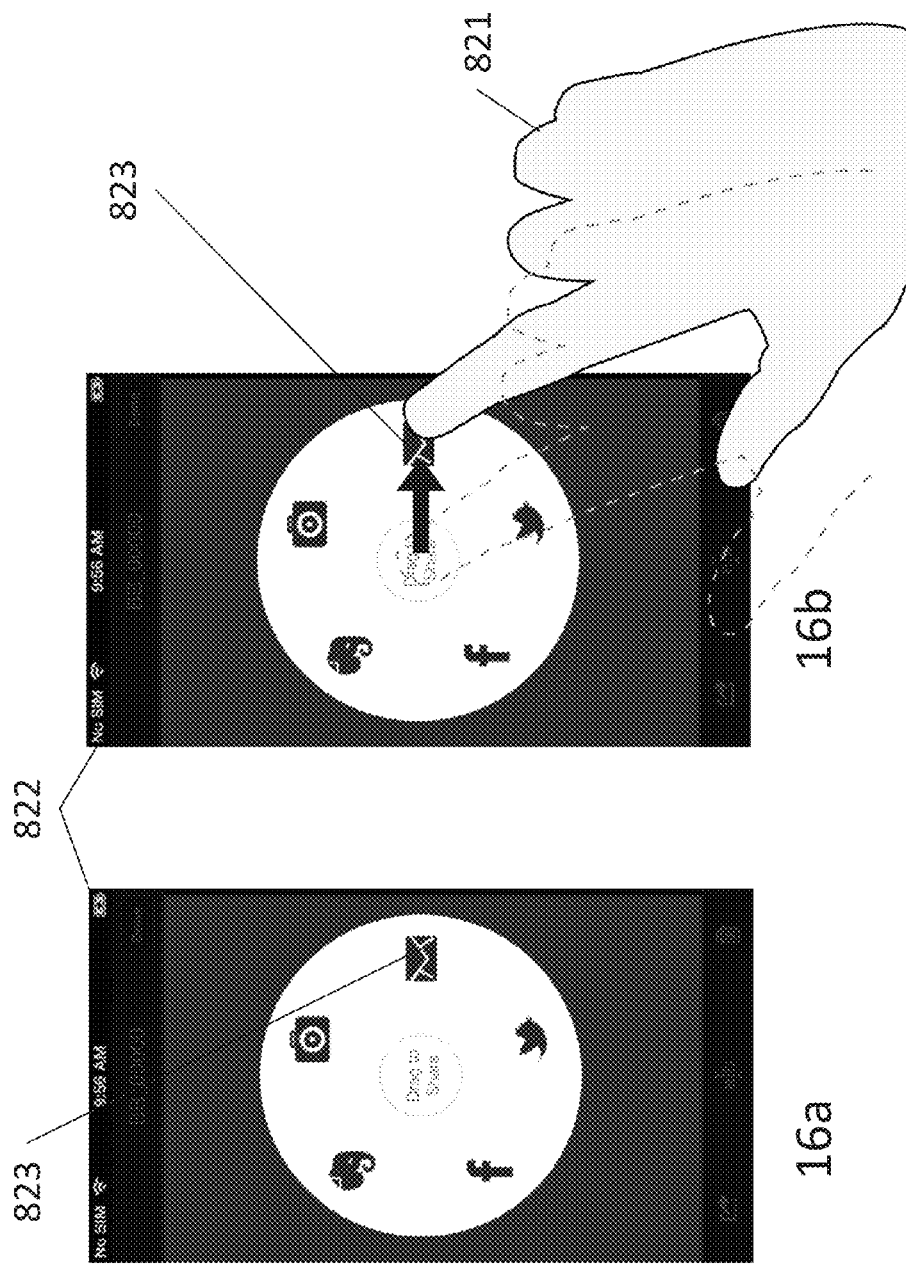
FIG. 16 shows a design and functionality of the "drag and share" software app.

The software on the external device can provide a customized user interface with a unique representation and functionality of a menu selector that appears on the connected external device. The menu selector can include a circle with words that represents the image to be shared, and various symbols arranged around the circle with words that represent menu items to be selected. The symbols provide an annular array of icons that graphically indicate different sharing options available for sharing the image. The icons are substantially equidistant from the words representing the image, or a thumbnail of the image, which is located at the center of the annular array of icons. The menu selector provides a "drag and share" application. FIG. 16 provides an illustration of the user interface and its functionality. FIG. 16a shows the appearance of the application as a user would see it on their connected external device, 822, specifically a smartphone. The circle or ring of icons, 823, represent the selectable sharing options for the user, for sharing/transferring the image to another, remote location. The envelope icon represents, for example, sending the image via the user's selected email service as an attachment. For the other icons, the camera would transfer the image to a user's selected camera to view or share, the elephant head would transfer the image to a user's selected Evernote account, the "f" would transfer the image to a user's selected Facebook account and the bird would transfer the image to a user's selected Twitter account. Any number of different icons representing different file transfer options can be provided in the annular array of icons. FIG. 16b shows the "drag" gesture that the user would perform: by placing the finger, 821, in contact with the center circle, at the center of the ring of sharing options, the user maintains continuous contact with the screen and moves, or radially "drags," from the center circle to a position over the desired icon on the ring of sharing options, in this example, the envelope, 823. The software will then transfer, or "share," the image via the functionality represented by the icon, in this example, via the user's selected email service. The user can use a stylus or finger to drag the image to one of the icons which causes the image to be sent via the telecommunications feature of the icon (e.g., Facebook, Twitter, etc.) The external device will then transmit the image over a network (e.g., the Internet) in accordance with the user's input, and the image will be sent to an appropriate remote device (e.g., a remote web server) for storage, viewing by others, etc. The user can share the image as a file that is not saved on the prototype writing tablet and is subsequently saved (as the original image and/or as enhanced image(s)) on the connected external device.

Figure 17:
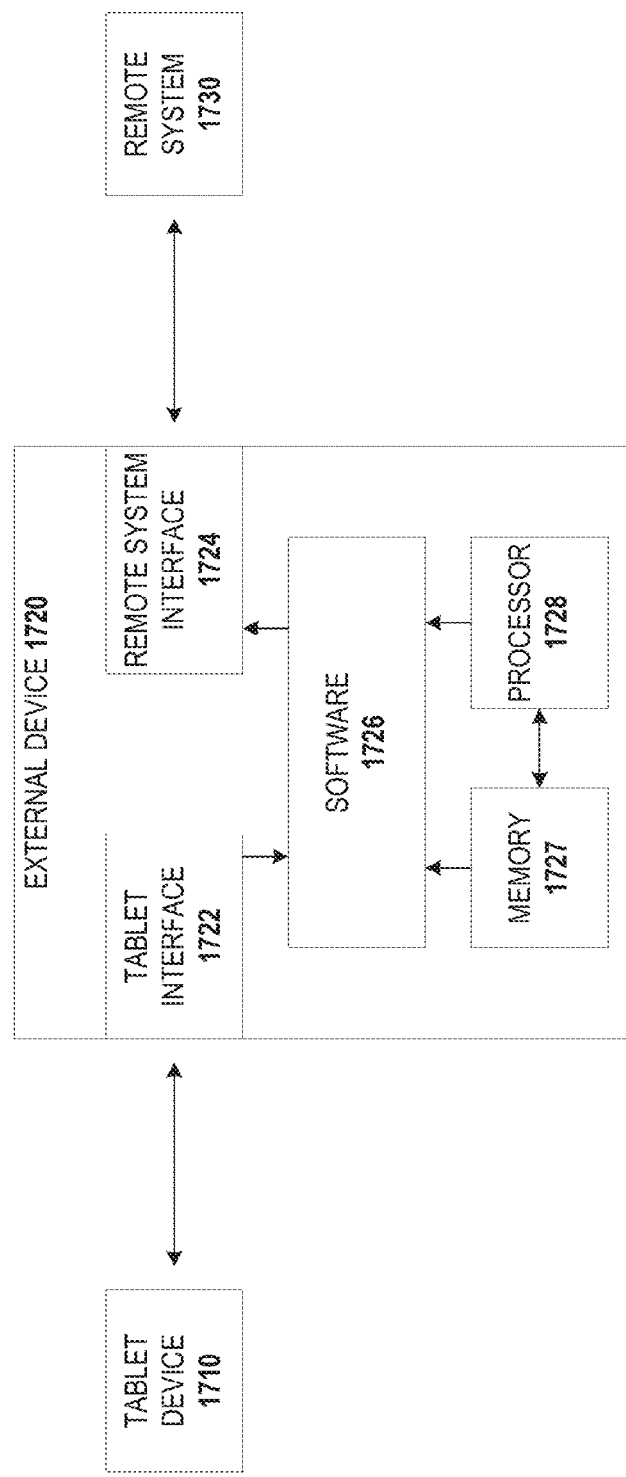
FIG. 17 is a schematic illustration of a writing tablet sharing information to a remote system via a connected external device.

FIG. 17 illustrates the transmission of the image to a remote system 1730, which can be, for example, a cloud-based or Internet-based service associated with the sharing option selected via the above described interface. One example of the remote system 1730 is a web server. As shown in FIG. 17, the transmission of the image from the tablet device 1710 can occur via the external device 1720. The transmission to the remote system 1730 can first involve storage and/or conversion of the image data received from the tablet device 1710 via a tablet interface 1722. The tablet device interface 1722 can be a wired or wireless communication interface as described above. The storage and/or conversion can be performed by software 1726 stored on memory 1727 and executed by processor 1728. After storage and/or conversion, the external device 1720 can send the image data to the remote system 1730 via a remote system interface 1724, which can a wired or wireless network interface, a cellular interface, etc. It is to be appreciated that the software 1726 can enable transmission of the image to the remote system 1730 without intervening storage and/or conversion. For example, the software 1726 can enable streaming of image data transmitted by the tablet device 1710 to the remote system 1730.

It is to be appreciated that the image data created on the prototype writing tablet can be shared from the external device, for example, in one, or a combination, of three ways: the image can be saved and stored in the prototype writing tablet internal memory and accessed by the external device (without being stored in the external device memory), the image can be saved and stored on the external device (without being stored in the prototype writing tablet internal memory) and the image can be immediately shared upon completion via the "drag and share" app without being saved either to the prototype writing tablet internal (non-volatile) memory or on the external device. The image can be accessed via the "drag and share" app from any of these three ways, and the user can send the image via the "drag and share" app for transfer to the internet service represented by icon on the menu selector (e.g., Facebook, Twitter, etc.).

It is also to be appreciated that the image data, which contains at least the position and pressure data, can be sent from the prototype writing tablet to the connected external device as the user creates the image in real time. The data transfer can be "one way," from only the prototype writing tablet to the connected external device. The prototype writing tablet can also continuously generate the digital ink files representing drawing strokes entered with a stylus on the drawing surface, and document files in a format used to represent documents in a manner independent of application software, hardware, and operating systems (e.g., .PDF). In an example embodiment, the digital ink files are in Ink Markup Language (INK) format and the document files are in .PDF format. Once the data structure of the image is transferred to the external device, either in real time or as completed and stored files, the external device can convert the data to file in the external device's memory, can transfer the file to another location (e.g., the internet) and can convert the data to a different file format (e.g., .PNG).

As discussed above, the image created on prototype writing tablet can be saved to a file on writing tablet and to a file on the external device for transfer to the Internet service represented by icon on menu selector (e.g., Facebook, Twitter, etc.) The drawing tablet device sends image data to the external device. The image data can be in the form of raw position, pressure and/or speed data, or the image data can be in the form of a more structured image file that captures individual drawing or pen strokes on the drawing surface. For example, the processor in the writing tablet can be programmed to create a digital ink file, such as an Ink Markup Language file, of the image from the electronic information representing the image that is captured by the data capture layer. The digital ink file is an image file that records the individual drawing strokes on the pressure sensitive drawing surface, such as stylus or pen strokes over time. Thus, a digital ink file is different from a file that records an entire image, which lacks, for example, stylus or pen strokes over time. The data capture device electronically captures and/or calculates position and information related to the pressure applied to the drawing surface when capturing an image drawn upon the pressure sensitive drawing surface, and the processor creates the digital ink file (e.g., Ink Markup Language file) based on the position and pressure information, and optionally speed information. To generate speed information, the processor can calculate the speed of the stylus or pen strokes, e.g., the speed of stylus movements on the pressure sensitive drawing surface, based on the position information received from the data capture device. The digital ink file can be proprietary or an industry standard (e.g., W3C-standard) Ink Markup Language. The Ink Markup Language file or other digital ink file can be directly transferred to an external device, or it can be embedded in another file and transferred to the external device. For example, a digital ink file can be embedded in a document file such as a portable document format (PDF) file of the image, for sharing with other devices. The writing tablet captures images drawn as (x/y/p) data (position and pressure information) and stores this data as two separate files—as a .PDF file and as a digital ink file—in the writing tablet. When the file save event (e.g., pressing the file save button) occurs, the .PDF file and the digital ink file are combined with a .PDF trailer into a single file that can be saved as follows: 1) On the internal storage memory of the writing tablet; 2) Simultaneously and/or subsequently transferred off the writing tablet to a connected external device for storage in the external device or for conversion to other formats for sharing on the internet (e.g., .PNG)

While digital ink file formats can be proprietary, the prototype writing tablet uses an open standard Ink Markup Language. Another embodiment can use a proprietary ink format, such as MICROSOFT Ink Standard Format (ISF).

The Ink Markup Language file or other digital ink file transferred from the prototype writing tablet in the .PDF can be accessed as a separate file by opening up the .PDF file. The Ink Markup Language file or other digital ink file can be saved as a separate file on the external device.

In certain embodiments, the prototype writing tablet that uses a ChLCD to capture line drawings can stream the drawings on the web to remote devices, via a connected external device. The external device would have a first interface for connecting to the tablet to receive image data from the tablet, and a second interface for connecting to a network, such as the Internet. For example, the first interface in the external device can receive the Ink Markup Language file from the tablet, and the second interface in the external device can forward the Ink Markup Language file to a remote web server via a network, such as the Internet.

Figure 18:
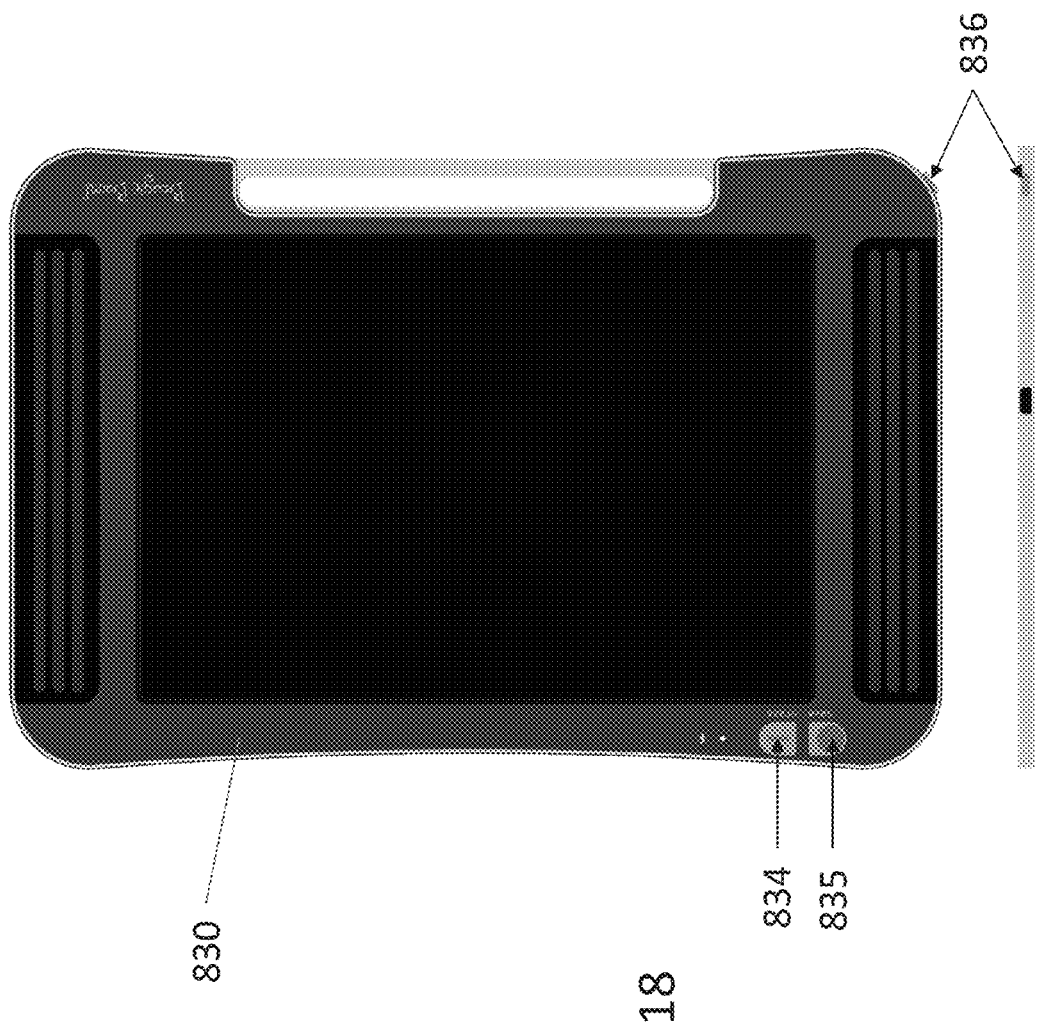
FIG. 18 shows the locations of the physical mechanical buttons on the prototype writing tablet that can be used in combination for specific functions on the tablet.

The writing tablet features multiple input devices for instructing the tablet to perform functions related to both the device (e.g., on/off) and to images created on the device and external device (e.g., for erase and save or capture). The input devices can be referred to as switches, although they do not necessarily require a mechanically moving switch contact. For example, the writing tablet could include touch switches, pushbuttons, or other types of switches as input devices. In FIG. 18, the tablet has an erase switch 834, a save switch 835, and an on/off switch 836.

The prototype writing tablet has two methods to save and erase images: (1) With USB method—The user cannot save the image on the prototype writing tablet—the image can only be saved on the connected external device; (2) With Bluetooth method—The user can save a monochromatic image on the Prototype writing tablet and, on the connected external device, the user can save: The monochromatic image as it appears on the prototype writing tablet, An enhanced colored image as it appears and has been edited on the external device, or An enhanced image that uses a software template. The prototype writing tablet creates two directories to store saved and erased files. When the erase switch is activated, the following actions can occur: (1) An electric pulse is sent across the ChLC display to clear the display (return it to blank state); (2) The prototype writing sends the image file to a "delete" directory in the memory on the prototype writing tablet without automatically synchronizing deleted files on external device. The external device can include a software mode that allows a user to view "erased" files stored in the "delete" directory on the writing tablet. Further, when the erase switch is activated, the software on the external device can send or display a notice that the file has been erased, and the external device can erase the enhanced version of the file (e.g., colored lines & background) on the external device.

The "save" switch, 835, allows a user to store the image drawn on the surface of the tablet to the tablet's internal memory. The "erase" switch, 834 triggers the sending of an electrical pulse across the surface of the display to entirely remove the figure that is drawn on the surface, leaving a clear surface for the user to create new images. The switches on the writing tablet can operate independently and in combination (e.g., as a "combo key") to perform additional functions. For example, turning on the tablet by pressing the on/off switch 836 while simultaneously activating the save switch 835 or erase switch 834 can cause the tablet to enter a communication establishing mode (e.g., a Bluetooth pairing mode) to establish communication with another device, such as the external device. In the communication establishing mode (e.g., Bluetooth pairing mode), the tablet can make itself discoverable to the external device, and the external device can establish a wireless connection to the tablet (e.g., after receiving a passkey). Turning on the tablet while simultaneously activating the save switch 835 or erase switch 834 can cause the tablet to enter a communication disable mode (e.g., disable Bluetooth functionality). This can allow the tablet to be operated in areas that request Bluetooth disablement (e.g., airplanes, hospitals, etc.) The Bluetooth pairing mode, Bluetooth disablement mode, or other modes can be triggered by simultaneously activating the erase and save switches, or other switches if present.

The tablet device can have a fixed internal memory (e.g., a flash memory) and can operate as a flash drive for the external device. Thus, the tablet device, and in particular the flash memory, can be configured to appear as a removable storage drive to the external processing device. That is, the tablet device can expose the flash memory to the external device as a mountable storage device, via the communication interface. The flash memory can store data received from the external device, and such data can be substantially unrelated to image files. For example, the flash memory can store documents, spreadsheets, audio files, etc. that are received from the external device.

The writing tablet in combination with a specialized stylus can provide mouse functionality, to allow the tablet to function in digitizer mode with respect to the external device. The stylus can be specifically designed so that the pressure sensitive digitizer can pick up position and pressure data (x/y/p data) for storage on the writing tablet or transfer to the external device. Preferably, the data capture feature of the writing tablet is only functional if a specialized stylus is used (e.g., stylus frequency matches writing tablet frequency). Any other drawing tool (e.g., fingernail) will cause an image to appear on the ChLCD of the drawing tablet, but because it cannot be recognized by the pressure sensitive digitizer, an image created by another drawing tool cannot be stored or transferred to a connected external device.

Figures 19A, 19B:
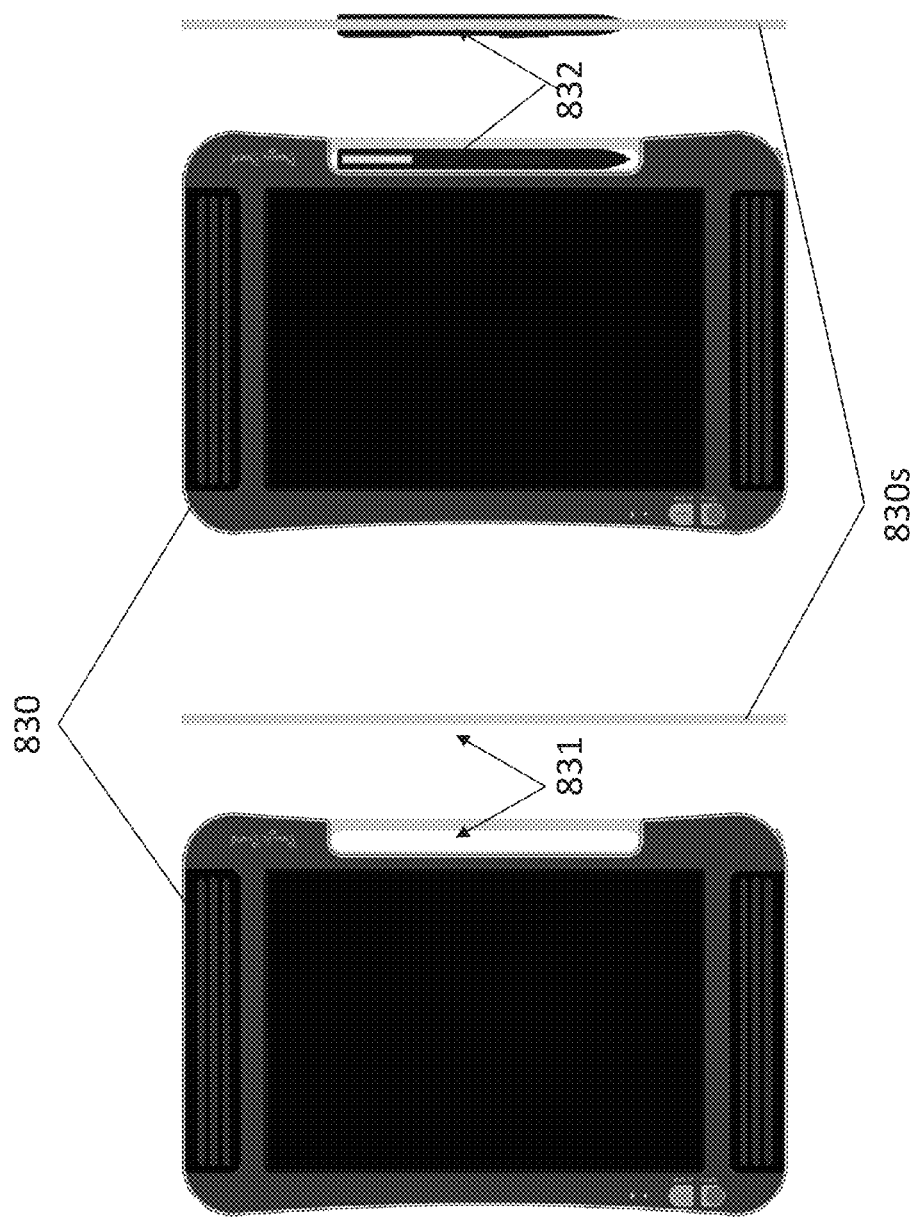
FIGS. 19a and 19b show the specially designed dock for the stylus.

As pictured in FIG. 19, the stylus, 832, is housed in the prototype writing tablet, 830, in a specially designed "hole" or receptacle that serves as a custom dock, 831. Such a design can provide a thin profile to the tablet when viewed from the side, while helping users to avoid misplacing or losing the specially designed stylus.

Many other example embodiments of the invention can be provided through various combinations of the above described features. Although the invention has been described hereinabove using specific examples and embodiments, it will be understood by those skilled in the art that various alternatives may be used and equivalents may be substituted for elements and/or steps described herein, without necessarily deviating from the intended scope of the invention. Modifications may be necessary to adapt the invention to a particular situation or to particular needs without departing from the intended scope of the invention. It is intended that the invention not be limited to the particular implementations and embodiments described herein, but that the claims be given their broadest reasonable interpretation to cover all novel and non-obvious embodiments, literal or equivalent, disclosed or not, covered thereby.

What is claimed is:

1. A system, comprising:
    a drawing tablet device; and
    an external processing device configured to receive image data from the drawing tablet device,
    the drawing tablet device comprising:
        a bistable cholesteric liquid crystal display configured to display an image drawn upon the bistable cholesteric liquid crystal display by application of pressure on the bistable cholesteric liquid crystal display, and to continue displaying the image without the bistable cholesteric liquid crystal display consuming electrical energy to display the image;
        an erase switch for selecting an erase function provided by the drawing tablet device to erase the image from the bistable cholesteric liquid crystal display;
        an electronic data capture device including a data capture layer configured to electronically capture movements of a stylus upon the bistable cholesteric liquid crystal display as electronic information representing the movements of the stylus; and
        an interface configured to connect to the external processing device, wherein the drawing tablet device is configured to transmit the image data to the external processing device, based on the electronic information representing the movements of the stylus, and wherein the image data comprises at least position information concerning positions of the stylus as the image is drawn and information related to pressure applied to the bistable cholesteric liquid crystal display as the image is drawn,
    the external processing device comprising:
        a further interface configured to connect to the drawing tablet device and receive the image data; and
        a further display that replicates the image drawn upon the bistable cholesteric liquid crystal display including replicating line widths in the image drawn upon the bistable cholesteric liquid crystal display, based on the information related to pressure applied to the bistable cholesteric liquid crystal display as the image is drawn,
    wherein the drawing tablet device automatically transmits, to the external processing device upon establishing communications with the external processing device, a plurality of image files stored in a memory on the drawing tablet device and representing a plurality of separate images captured by the electronic data capture device, and
    wherein the external processing device is configured to automatically forward the plurality of image files to another external processing device.

2. The system of claim 1, wherein the drawing tablet device automatically transmits, to the external processing device without receiving a corresponding transmit command from a user, the plurality of image files stored on the drawing tablet device.

3. The system of claim 1, wherein the drawing tablet device further comprises a flash memory for storing data received from the external processing device via the interface, wherein said flash memory is configured to appear as a removable storage drive to the external processing device.

4. The system of claim 1, wherein the image data received by the external processing device comprises a digital ink file embedded in a document file comprising the image drawn upon the bistable cholesteric liquid crystal display.

5. The system of claim 4, wherein the digital ink file is an Ink Markup Language file.

6. The system of claim 1, wherein the external processing device is configured to automatically forward the plurality of image files to a remote web server.

7. The system of claim 1, wherein the drawing tablet device includes a power switch for turning the drawing tablet device on, and wherein a simultaneous activation of the power switch and the erase switch causes the drawing tablet device to enter one of a communication establishing mode to establish communications with the external processing device and a communication disable mode to disable communications through the interface.

8. The system of claim 1, wherein the drawing tablet device further comprises:
    a power switch for turning the drawing tablet device on; and
    a save switch for selecting a save function provided by the drawing tablet device to save the image data in the memory,
    wherein a simultaneous activation of a plurality of switches on the drawing tablet device causes the drawing tablet device to enter a communication pairing mode to establish communications with the external processing device.

9. The system of claim 8, wherein a simultaneous activation of another plurality of the switches causes the drawing tablet device to enter a communication disable mode to disable communications through the interface.

10. The system of claim 1, wherein the interface of the drawing tablet device and the further interface of the external processing device are wirelessly connected, and wherein the image data received by the external processing device comprises an Ink Markup Language file embedded in a portable document format (PDF) file.

11. The system of claim 1, wherein the drawing tablet device converts the electronic information to a document file.

12. The system of claim 11, wherein the document file is a portable document format (PDF) file.

13. The system of claim 1, wherein the drawing tablet device converts the electronic information to a digital ink file.

14. The system of claim 1, wherein the interface is a wireless communication interface.

15. A system, comprising:
a drawing tablet device; and
an external processing device configured to receive image data from the drawing tablet device,
the drawing tablet device comprising:
a bistable cholesteric liquid crystal display configured to display an image drawn upon the bistable cholesteric liquid crystal display by application of pressure on the bistable cholesteric liquid crystal display, and to continue displaying the image without the bistable cholesteric liquid crystal display consuming electrical energy to display the image;
an erase switch for selecting an erase function provided by the drawing tablet device to erase the image from the bistable cholesteric liquid crystal display;
an electronic data capture device including a data capture layer configured to electronically capture movements of a stylus upon the bistable cholesteric liquid crystal display as electronic information representing the movements of the stylus; and
an interface configured to connect to the external processing device, wherein the drawing tablet device is configured to transmit the image data to the external processing device, based on the electronic information representing the movements of the stylus, and wherein the image data comprises at least position information concerning positions of the stylus as the image is drawn and information related to pressure applied to the bistable cholesteric liquid crystal display as the image is drawn,
the external processing device comprising:
a further interface configured to connect to the drawing tablet device and receive the image data; and
a further display that replicates the image drawn upon the bistable cholesteric liquid crystal display including replicating line widths in the image drawn upon the bistable cholesteric liquid crystal display, based on the information related to pressure applied to the bistable cholesteric liquid crystal display as the image is drawn, wherein the image data further comprises speed information concerning a drawing speed, and the line widths replicated on the further display are determined and replicated by processing both of the information related to pressure applied to the bistable cholesteric liquid crystal display as the image is drawn and the speed information.

16. A system, comprising:
a drawing tablet device; and
a capture application configured to execute on an external device having a processor coupled to a non-transitory, computer-readable medium storing the capture application and a display, the capture application is configured to acquire image data from the drawing tablet device,
the drawing tablet device, comprising:
a bistable cholesteric liquid crystal display having a drawing surface configured to display an image drawn upon the drawing surface by application of pressure on the drawing surface, the bistable cholesteric liquid crystal display maintains display of the image on the drawing surface without consuming electrical energy;
a data capture device configured to generate electronic information corresponding to movement of a stylus on the drawing surface, the data capture device operating separately and independently from the bistable cholesteric liquid crystal display; and
a communication interface to transmit image data based on the electronic information to the capture application executing on the external device, in real-time or near real-time, upon generation by the data capture device,
wherein the capture application is configured to render an image to the display of the external device, the image being a replica of the image displayed on the drawing surface by the bistable cholesteric liquid crystal display and based on the image data received from the drawing tablet device,
wherein the image data transmitted by the drawing tablet device comprises a plurality of pairs of position information and magnitude information relating to contacts of the stylus on the drawing surface, and
the capture application is further configured to convert the pairs of position information and magnitude information to an image file for storage on the external device, display on the external device, or sharing via the Internet, and
wherein the capture application is further configured to analyze the pairs of position information and magnitude information to recognize handwriting within the electronic information.

17. The system of claim 16, wherein the capture application is further configured to receive user input via an input device of the external device and to update the image rendered on the display based on the user input.

18. The system of claim 16, wherein the capture application renders the replica of the image displayed on the drawing surface with line widths matching the image displayed by the bistable cholesteric liquid crystal display.

19. The system of claim 18, wherein the electronic information is transmitted by the drawing tablet device and comprises position information and magnitude information, and
the capture application matches line widths with the image displayed by the bistable cholesteric liquid crystal display based on the position information and the magnitude information.

* * * * *

UNITED STATES PATENT AND TRADEMARK OFFICE
CERTIFICATE OF CORRECTION

PATENT NO. : 9,134,561 B2  Page 1 of 1
APPLICATION NO. : 14/057261
DATED : September 15, 2015
INVENTOR(S) : Marhefka et al.

It is certified that error appears in the above-identified patent and that said Letters Patent is hereby corrected as shown below:

In the specification:

In column 5, line 16, please delete "POT" and replace with --PCT--

Signed and Sealed this
Fifteenth Day of March, 2016

Michelle K. Lee
*Director of the United States Patent and Trademark Office*